(12) United States Patent
Negri Jimenez et al.

(10) Patent No.: US 12,233,597 B2
(45) Date of Patent: Feb. 25, 2025

(54) THREE-DIMENSIONAL PRINTING

(71) Applicant: HEWLETT-PACKARD DEVELOPMENT COMPANY, L.P., Spring, TX (US)

(72) Inventors: Graciela E Negri Jimenez, San Diego, CA (US); Shannon Reuben Woodruff, San Diego, CA (US); Emre Hiro Discekici, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 327 days.

(21) Appl. No.: 17/996,628

(22) PCT Filed: Apr. 23, 2020

(86) PCT No.: PCT/US2020/029535
§ 371 (c)(1),
(2) Date: Oct. 20, 2022

(87) PCT Pub. No.: WO2021/216072
PCT Pub. Date: Oct. 28, 2021

(65) Prior Publication Data
US 2023/0226754 A1    Jul. 20, 2023

(51) Int. Cl.
*B29C 64/165* (2017.01)
*B29C 64/153* (2017.01)
(Continued)

(52) U.S. Cl.
CPC .......... *B29C 64/165* (2017.08); *B29C 64/153* (2017.08); *B29C 64/30* (2017.08);
(Continued)

(58) Field of Classification Search
CPC ..... B29C 64/165; B29C 64/153; B29C 64/30; B29C 71/0009; B33Y 10/00; B33Y 40/20;
(Continued)

(56) References Cited

U.S. PATENT DOCUMENTS 5,132,191 A * 7/1992 Zarnoch ............... H05K 9/0084
428/626
5,360,667 A * 11/1994 Boles, Jr. .................. D01F 6/60
264/210.8
(Continued)

FOREIGN PATENT DOCUMENTS

JP    63145333    *  6/1988
JP    02173046    *  7/1990
(Continued)

OTHER PUBLICATIONS

Bain, D. E., et al., "AMB2018-04: Benchmark Physical Property Measurements for Powder Bed Fusion Additive Manufacturing of Polyamide 12", Aug. 5, 2019, Integrating Materials and Manufacturing Innovation, 27 pages.

*Primary Examiner* — Jeffrey M Wollschlager
(74) *Attorney, Agent, or Firm* — Dierker & Kavanaugh, P.C.

(57) ABSTRACT

An example of a multi-fluid kit for three-dimensional (3D) printing kit includes a fusing agent and a build material reactive functional agent. The fusing agent includes water and an electromagnetic radiation absorber. The build material reactive functional agent includes a vehicle and trifluoroacetic anhydride. The multi-fluid kit may also be part of a 3D printing kit.

15 Claims, 8 Drawing Sheets

(51) Int. Cl.
*B29C 64/30* (2017.01)
*B29C 71/00* (2006.01)
*B29K 77/00* (2006.01)
*B33Y 10/00* (2015.01)
*B33Y 40/20* (2020.01)
*B33Y 70/00* (2020.01)
*C09D 177/02* (2006.01)

(52) U.S. Cl.
CPC .......... *B29C 71/0009* (2013.01); *B33Y 10/00* (2014.12); *B33Y 40/20* (2020.01); *B33Y 70/00* (2014.12); *C09D 177/02* (2013.01); *B29K 2077/00* (2013.01)

(58) Field of Classification Search
CPC ... B33Y 70/00; C09D 177/02; B29K 2077/00
See application file for complete search history.

(56) References Cited

U.S. PATENT DOCUMENTS

| | | | | |
|---|---|---|---|---|
| 5,580,616 | A * | 12/1996 | Niino | H05K 3/185 |
| | | | | 427/322 |
| 6,099,632 | A * | 8/2000 | Nagasawa | C09D 11/324 |
| | | | | 106/478 |
| 2003/0055243 | A1 * | 3/2003 | Lee | C07H 21/00 |
| | | | | 549/213 |
| 2010/0284664 | A1 * | 11/2010 | Masuda | C08G 73/1039 |
| | | | | 385/142 |
| 2011/0184196 | A1 * | 7/2011 | Chidsey | B82Y 40/00 |
| | | | | 552/1 |
| 2012/0193829 | A1 | 8/2012 | Ikeuchi et al. | |
| 2019/0054690 | A1 * | 2/2019 | Feng | B33Y 40/10 |
| 2019/0077080 | A1 * | 3/2019 | Zhao | B29C 64/393 |
| 2019/0092799 | A1 * | 3/2019 | Olubummo | C09D 11/38 |
| 2019/0111619 | A1 * | 4/2019 | Schalk | B33Y 70/00 |
| 2019/0134896 | A1 * | 5/2019 | Lebron | B33Y 10/00 |
| 2019/0134897 | A1 * | 5/2019 | Williams | B33Y 30/00 |
| 2019/0240898 | A1 * | 8/2019 | Chaffins | B29C 64/255 |
| 2019/0382429 | A1 * | 12/2019 | Olubummo | C09D 11/38 |
| 2020/0079966 | A1 * | 3/2020 | Holt | C09D 11/322 |
| 2020/0115574 | A1 * | 4/2020 | Querol Esparch | C08L 23/12 |

FOREIGN PATENT DOCUMENTS

| | | |
|---|---|---|
| JP | 09-111655 A | 4/1997 |
| JP | 2002-138367 A | 5/2002 |
| WO | 2011/145960 A1 | 11/2011 |
| WO | 2017/069778 A1 | 4/2017 |
| WO | 2018/012643 A1 | 1/2018 |
| WO | 2018/199955 A1 | 11/2018 |
| WO | 2019/201922 A1 | 10/2019 |

* cited by examiner

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial coalescence of the build material, and the mechanism for material coalescence (e.g., curing, thermal merging/fusing, melting, sintering, etc.) may depend upon the type of build material used. For some materials, at least partial coalescence may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
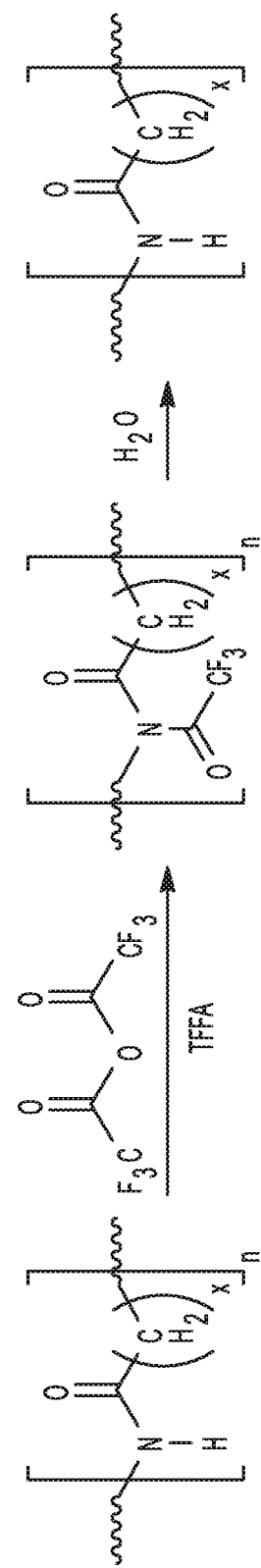
FIG. 1 is a chemical reaction illustrating the N-acylation of —NH groups of polyamide with trifluoroacetic anhydride, and then the subsequent hydrolysis to obtain the original polyamide.

Some examples of three-dimensional (3D) printing may utilize a fusing agent (including an electromagnetic radiation absorber) to pattern polymeric build material, such as polyamide build material. In these examples, an entire layer of the polyamide build material is exposed to electromagnetic radiation, but the patterned region (which, in some instances, is less than the entire layer) of the polyamide build material is fused/coalesced and hardened to become a layer of a 3D part. In the patterned region, the fusing agent is capable of at least partially penetrating into voids between the polyamide build material particles, and is also capable of spreading onto the exterior surface of the polyamide build material particles. This fusing agent is capable of absorbing radiation and converting the absorbed radiation to thermal energy, which in turn fuses/coalesces the polyamide build material that is in contact with the fusing agent. Fusing/coalescing causes the polymeric build material to join or blend to form a single entity (i.e., the layer of the 3D part). Fusing/coalescing may involve at least partial thermal merging, melting, binding, and/or some other mechanism that coalesces the polyamide build material to form the layer of the 3D object.

The surface properties of 3D objects printed in this manner may be rough and include defects that are difficult to fix. Both physical and chemical post-process finishing techniques have been used to reduce surface roughness and defects of 3D printed objects. Some physical processes, such as sanding, can deleteriously impact object accuracy and color. Furthermore, polyamides include repeat units with long carbon chain lengths, which render them relatively chemically inert. Because polyamides are relatively chemically inert, they are not readily soluble in many solvents. Thus, chemical finishing processes for polyamide 3D objects may involve harsh (e.g., corrosive, etc.) solvents, such as strong acids, phenols, some aliphatic fluorinated alcohols, etc. Such solvents can complicate post-processing (e.g., may involve more rigorous conditions) and/or may be undesirable.

In the examples disclosed herein, a build material reactive functional agent is jetting on at least some of the polyamide build material during the 3D printing process. The portions of the 3D object that are exposed to the build material reactive functional agent during printing are vastly different from the intrinsic property of the bulk polyamide build material that is used. This is due to the fact that the build material reactive functional agent modifies the chemical structure of the polyamide backbone to introduce polarity, and thus increase the solubility. Increased solubility at the surface(s) of the 3D object render the surface(s) more susceptible to chemical finishing processes that involve gentle solvents and benign conditions.

Moreover, the ability to jet the build material reactive functional agent via any suitable inkjet printing technique enables controlled (and potentially varying) solubility to be spatially incorporated into the periphery of 3D printed objects at the voxel level.

Throughout this disclosure, a weight percentage that is referred to as "wt % active" refers to the loading of an active component of a dispersion or other formulation that is present, e.g., in the build material reactive functional agent, fusing agent, detailing agent, etc. For example, an electromagnetic radiation absorber, such as carbon black, may be present in a water-based formulation (e.g., a stock solution or dispersion) before being incorporated into the fusing agent vehicle. In this example, the wt % actives of the carbon black accounts for the loading (as a weight percent) of the carbon black solids that are present in the fusing agent, and does not account for the weight of the other components (e.g., water, etc.) that are present in the stock solution or dispersion with the carbon black. The term "wt %," without the term actives, refers to either i) the loading (in the build material reactive functional agent, fusing agent, etc.) of a 100% active component that does not include other non-active components therein, or ii) the loading (in the hydrophilic agent, fusing agent, etc.) of a material or component that is used "as is" and thus the wt % accounts for both active and non-active components.

3D Printing Multi-Fluid Kits and 3D Printing Kits

The examples disclosed herein include multi-fluid kits for three-dimensional (3D) printing and three-dimensional (3D) printing kits.

An example of a multi-fluid kit includes: i) a fusing agent including water and an electromagnetic radiation absorber; and ii) a build material reactive functional agent including a vehicle and trifluoroacetic anhydride. Some examples of the multi-fluid kit further include a coloring agent selected from the group consisting of a black ink, a cyan ink, a magenta ink, or a yellow ink; or a detailing agent including a surfactant, a co-solvent, and water; or both the coloring agent and the detailing agent.

Any example of the multi-fluid kit may also be part of a 3D printing kit and/or composition. As such, one example of a 3D printing kit includes: a powder polyamide build material; a fusing agent including water and an electromagnetic radiation absorber; and a build material reactive functional agent including a vehicle and trifluoroacetic anhydride.

It is to be understood that the fluids of the multi-fluid kits or the fluids and the powder polyamide build material of the 3D printing kits may be maintained separately until used together in examples of the 3D printing method disclosed herein. The fluids and/or build material may each be contained in one or more containers prior to and during printing, but may be combined together during printing. The containers can be any type of a vessel (e.g., a reservoir), box, or receptacle made of any material.

As used herein, it is to be understood that the terms "set" or "kit" may, in some instances, be synonymous with "composition."

As mentioned above, various agents may be included in the multi-fluid kits and/or 3D printing kits disclosed herein. Example compositions of the build material reactive functional agent, the fusing agents, the detailing agent, the coloring agent, and the powder polyamide build material will now be described.

Build Material Reactive Functional Agent

The build material reactive functional agent includes a vehicle and trifluoroacetic anhydride. The vehicle may be water, a water miscible organic solvent that is inert to the trifluoroacetic anhydride, or a combination of water and the water miscible organic solvent. In some examples, the build material reactive functional agent consists of these components. In other examples, the build material reactive functional agent may include other additives, such as a surfactant, a catalyst and/or a buffer.

Trifluoroacetic anhydride is included in the build material reactive functional agent to facilitate the chemical transformation of the polyamide build material during the 3D printing process. Polyamides include secondary amides, where each nitrogen atom is bonded to two carbon atoms in the backbone chain and a hydrogen atom. The —NH group of the secondary amide can undergo N-acylation with the trifluoroacetic anhydride to generate a modified polyamide (e.g., a trifluoroacetylated polyamide). This functionalization removes the hydrogen bond donating ability of the polyamide, which further reduces interchain interactions and increases the solubility of the modified polyamide in a wider range of solvents.

Referring now to FIG. 1, the first reaction shown is the reaction of the secondary amide groups in polyamide-66 with trifluoroacetic anhydride (TFAA). This reaction yields a modified polyamide-66 product that is soluble, e.g., in tetrahydrofuran (THF), dioxane, chlorinated hydrocarbons, acetone, acetonitrile, and dimethylformamide (DMF). As shown in FIG. 1, this reaction is also reversible. For example, upon treatment with water, hydrolysis occurs to convert the polymer backbone back to its original structure.

Trifluoroacetic anhydride is present in an amount ranging from about 1 wt % active to about 20 wt % active of a total weight of the build material reactive functional agent. In other examples, trifluoroacetic anhydride is present in other amounts, e.g., ranging from about 2 wt % active to about 18 wt % active, or from about 5 wt % active to about 10 wt % active, or from about 7 wt % active to about 15 wt % active, etc. based on the total weight of the build material reactive functional agent. In one example of the build material reactive functional agent, the trifluoroacetic anhydride is present in an amount of about 10 wt % active.

The build material reactive functional agent further includes a liquid vehicle. The liquid vehicle may be water, a water miscible organic solvent that is inert to the trifluoroacetic anhydride, or combinations of water and the water miscible organic solvent. The vehicle used may depend upon the application method for the build material reactive functional agent. For example, when the build material reactive functional agent is to be applied via a thermal inkjet printhead, the vehicle includes at least 70% by weight of water, and may or may not include the water miscible organic solvent. For another example, when the build material reactive functional agent is to be applied via a piezoelectric inkjet printhead, the liquid vehicle includes at least 50% by weight of the solvent, and may or may not include the water.

Any water miscible organic solvent that is inert to the trifluoroacetic anhydride may be used in the vehicle. As such, the water miscible organic solvent is moderately polar. Examples of the water miscible organic solvent may be selected from the group consisting of acetonitrile, tetrahydrofuran, 1,4-dioxane, acetone, dimethylformamide, ethyl acetate, chlorinated hydrocarbons, and combinations thereof.

When included, the water miscible organic solvent is present in an amount ranging from about 1 wt % to about 80 wt % of a total weight of the build material reactive functional agent. In other examples, the water miscible organic solvent is present in other amounts, e.g., ranging from about 5 wt % to about 50 wt %, or from about 10 wt % to about 40 wt %, or from about 25 wt % to about 55 wt %, etc. based on the total weight of the build material reactive functional agent. In one example of the build material reactive functional agent, the water miscible organic solvent is present in an amount of about 40 wt %.

When included, the water is present in an amount ranging from about 10 wt % to about 90 wt % of a total weight of the build material reactive functional agent. The water may be e.g., deionized water, purified water, etc. The amount of water in the build material reactive functional agent may vary, depending upon the jetting architecture to be used. When water makes up the balance of the formulation, the amount of water also depends upon the other component(s), including any co-solvent if present, in the build material reactive functional agent.

The build material reactive functional agent may further include a surfactant. Suitable surfactant(s) for the build material reactive functional agent include non-ionic, anionic, or cationic surfactants. It may be desirable to select a surfactant that does not react with the trifluoroacetic anhydride. Some example surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, fluorosurfactants, and the like. Some specific examples include a self-emulsifiable, non-ionic wetting agent based on acetylenic diol chemistry (e.g., SURFYNOL® SEF from Evonik Degussa), a non-ionic fluorosurfactant (e.g., CAPSTONE® fluorosurfactants, such as CAPSTONE® FS-35, from Chemours), an ethoxylated low-foam wetting agent (e.g., SURFYNOL® 440 or SURFYNOL® CT-111 from Evonik Degussa), an ethoxylated wetting agent and molecular defoamer (e.g., SURFYNOL® 420 from Evonik Degussa), non-ionic wetting agents and molecular defoamers (e.g., SURFYNOL® 104E from Evonik Degussa), and/or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TECO® Wet 510 (organic surfactant) available from Evonik Degussa). Yet another suitable (anionic) surfactant includes alkyldiphenyloxide disulfonate (e.g., the DOWFAX™ series, such a 2A1, 3B2, 8390, C6L, C10L, and 30599, from The Dow Chemical Company). If a surfactant(s) is included that is reactive with trifluoroacetic anhydride, the pH, concentration, and/or solvent may be selected to reduce or prevent the reactivity.

Whether a single surfactant is used or a combination of surfactants is used, the total amount of surfactant(s) in the build material reactive functional agent may range from about 0.01 wt % active to about 3 wt % active based on the total weight of the build material reactive functional agent. In an example, the total amount of surfactant(s) in the build material reactive functional agent may be about 1 wt % active based on the total weight of the build material reactive functional agent.

In still other examples, the build material reactive functional agent may include a catalyst to increase the rate of reaction between the trifluoroacetic anhydride and the polyamide build material. Example catalysts include 4-dimethylaminopyridine, trimethylamine, or another nucleophile. When included, the catalyst is present in an amount ranging from about 0.01 wt % active to about 1 wt % active of a total weight of the build material reactive functional agent. In other examples, the catalyst is present in other amounts, e.g., ranging from about 0.02 wt % active to about 0.8 wt % active, or from about 0.1 wt % active to about 0.5 wt % active, etc. based on the total weight of the build material reactive functional agent. In one example of the build material reactive functional agent, the catalyst is present in an amount of about 0.1 wt % active.

The build material reactive functional agent may also include a buffer to prevent undesirable changes in the pH. Examples of buffers include TRIS (tris(hydroxymethyl) aminomethane or TRIZMA®), TRIS or TRIZMA® hydrochloride, bis-tris propane, TES (2-[[(2-Hydroxy-1,1-bis(hydroxymethyl)ethyl)amino]ethanesulfonic acid), MES (2-ethanesulfonic acid), MOPS (3-(N-morpholino)propanesulfonic acid), HEPES (4-(2-hydroxyethyl)-1-piperazineethanesulfonic acid), DIPSO (3-(N,N-Bis[2-hydroxyethyl]amino)-2-hydroxypropanesulfonic acid), Tricine (N-[tris(hydroxymethyl)methyl]glycine), HEPPSO (β-Hydroxy-4-(2-hydroxyethyl)-1-piperazinepropanesulfonic acid monohydrate), POPSO (Piperazine-1,4-bis(2-hydroxypropanesulfonic acid) dihydrate), EPPS (4-(2-Hydroxyethyl)-1-piperazinepropanesulfonic acid, 4-(2-Hydroxyethyl)piperazine propanesulfonic acid), TEA (triethanolamine buffer solution), Gly-Gly (Diglycine), bicine (N,N-Bis(2-hydroxyethyl)glycine), HEPBS (N-(2-Hydroxyethyl)piperazine-N'-(4-butanesulfonic acid)), TAPS ([tris(hydroxymethyl)methylamino]propanesulfonic acid), AMPD (2-amino-2-methyl-1,3-propanediol), TABS (N-tris (Hydroxymethyl)methyl aminobutanesulfonic acid), or the like.

Whether a buffer is used or a combination of buffers is used, the total amount of buffer(s) in the build material reactive functional agent may range from greater than 0 wt % active to about 1 wt % active based on the total weight of the build material reactive functional agent. In another example, the buffer is present in other amounts, e.g., ranging from about 0.25 wt % active to about 0.75 wt % based on the total weight of the build material reactive functional agent. In an example, the buffer(s) is/are present in the build material reactive functional agent in an amount of about 0.5 wt % active (based on the total weight of the build material reactive functional agent).

Fusing Agents

The multi-fluid kit(s) and/or 3D printing kit(s) disclosed herein include one or more fusing agents. The fusing agents include an electromagnetic radiation absorber, which absorb radiation and generate heat sufficient to coalesce/fuse the polyamide build material composition in contact therewith during 3D printing.

An example of the fusing agent is a core fusing agent and the electromagnetic radiation absorber has absorption (e.g., at least 80%) at least at wavelengths ranging from 400 nm to 780 nm (e.g., in the visible region). As noted, this example of the fusing agent is referred to as the core fusing agent, or, in some instances, the black fusing agent. As described herein, the electromagnetic radiation absorber (also referred to as an energy absorber or active material) in the core fusing agent may also absorb energy in the infrared region (e.g., 800 nm to 4000 nm). This absorption generates heat suitable for coalescing/fusing the polyamide build material composition in contact therewith during 3D printing, which leads to 3D objects (or 3D objects regions) having mechanical integrity and relatively uniform mechanical properties (e.g., strength, elongation at break, etc.). This absorption, however, also results in strongly colored, e.g., black, 3D objects (or 3D objects regions).

Another example of the fusing agent is a primer fusing agent and the electromagnetic radiation absorber is a plasmonic resonance absorber having absorption at wavelengths ranging from 800 nm to 4000 nm and having transparency at wavelengths ranging from 400 nm to 780 nm. As noted, this example of the fusing agent is referred to as the primer fusing agent, or, in some instances, the low tint fusing agent. This absorption and transparency allows the primer fusing agent to absorb enough radiation to coalesce/fuse the build material composition in contact therewith, while enabling the 3D objects (or 3D objects regions) to be white or slightly colored.

Still other examples of the electromagnetic radiation absorber absorb at least some of the wavelengths within the range of 400 nm to 4000 nm. Examples include glass fibers, titanium dioxide, clay, mica, talc, barium sulfate, calcium carbonate, phosphate pigments, and/or silicate pigments. These energy absorbers are often white or lightly colored and may be used in either the core fusing agent or the primer fusing agent.

Phosphates may have a variety of counterions, such as copper, zinc, iron, magnesium, calcium, strontium, the like, and combinations thereof. Examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, Cu/ZnP$_2$O$_7$, or any other suitable combination of counterions. Silicates can have the same or similar counterions as phosphates. Example silicates can include M$_2$SiO$_4$, M$_2$Si$_2$O$_6$, and other silicates where M is a counterion having an oxidation state of +2. For example, the silicate M$_2$Si$_2$O$_6$ can include Mg$_2$Si$_2$O$_6$, Mg/CaSi$_2$O$_6$, MgCuSi$_2$O$_6$, Cu$_2$Si$_2$O$_6$, Cu/ZnSi$_2$O$_6$, or other suitable combination of counterions. It is noted that the phosphates and silicates described herein are not limited to counterions having a +2 oxidation state, and that other counterions can also be used to prepare other suitable near-infrared pigments.

As used herein "absorption" means that at least 80% of radiation having wavelengths within the specified range is absorbed. Also used herein, "transparency" means that 25% or less of radiation having wavelengths within the specified range is absorbed.

Core Fusing Agent

Some examples of the core fusing agent are dispersions including an electromagnetic radiation absorber. In some examples, the electromagnetic radiation absorber may be an infrared light absorbing colorant. In an example, the electromagnetic radiation absorber is a near-infrared light absorbing colorant. Any near-infrared colorants, e.g., those produced by Fabricolor, Eastman Kodak, or BASF, Yamamoto, may be used in the core fusing agent. As one example, the core fusing agent may be a printing liquid formulation including carbon black as the active material. Examples of this printing liquid formulation are commercially known as CM997A, 516458, C18928, C93848, C93808, or the like, all of which are available from HP Inc.

As another example, the core fusing agent may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

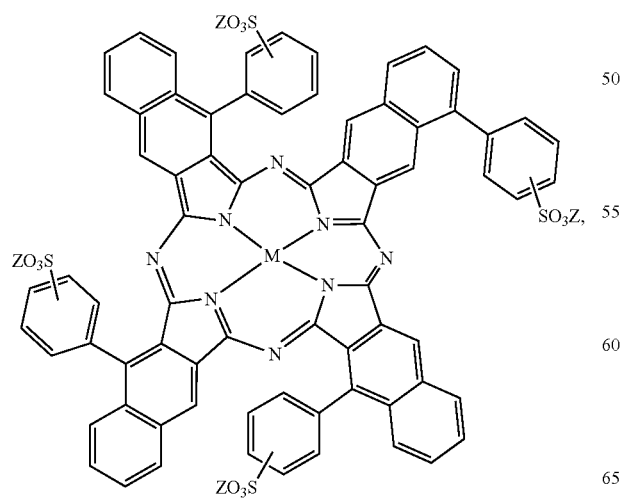

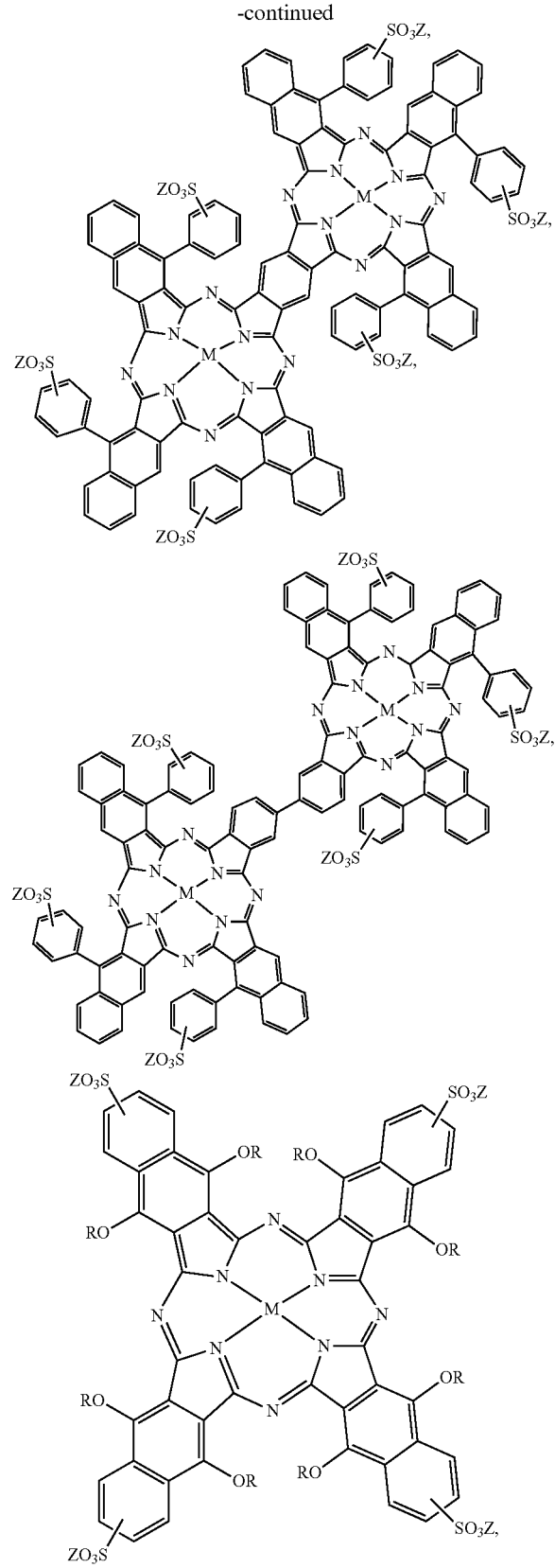

and mixtures thereof. In the above formulations, M can be a divalent metal atom (e.g., copper, etc.) or can have OSO$_3$Na axial groups filling any unfilled valencies if the metal is more than divalent (e.g., indium, etc.), R can be hydrogen or any $C_1$-$C_8$ alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

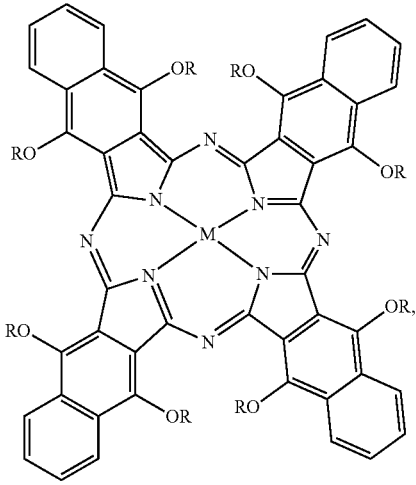

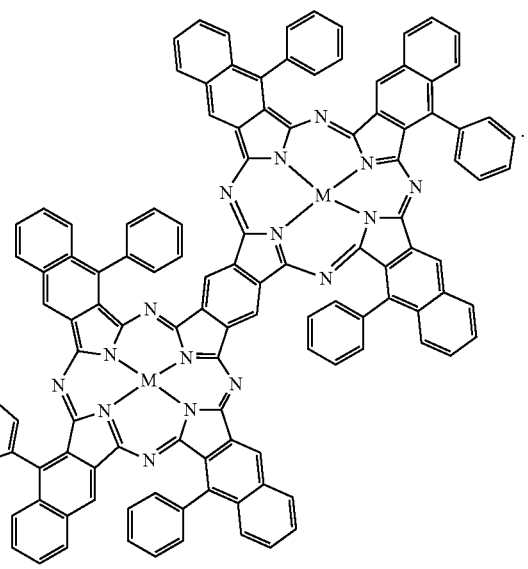

and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be hydrogen or any $C_1$-$C_8$ alkyl group (including substituted alkyl and unsubstituted alkyl).

Other near-infrared absorbing dyes or pigments may be used in the core fusing agent. Some examples include anthraquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthraquinone dyes or pigments and metal (e.g., nickel) dithiolene dyes or pigments may have the following structures, respectively:

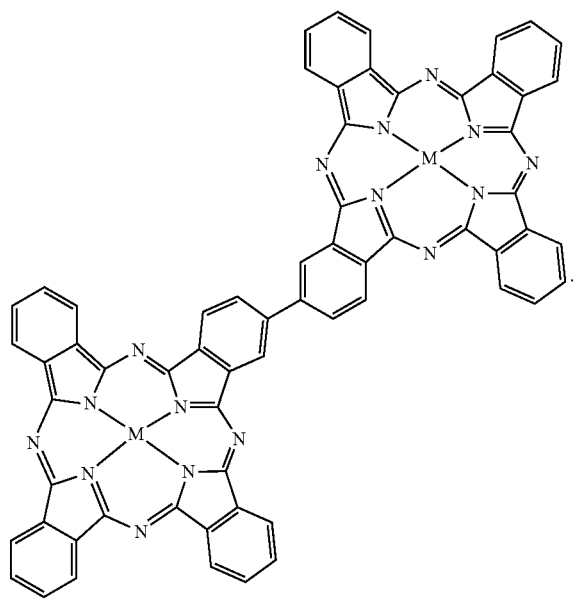

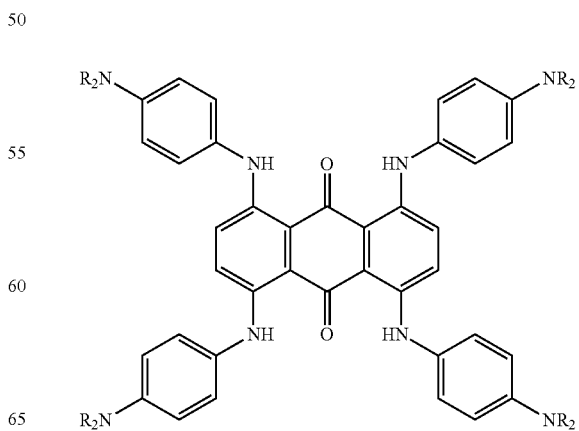

-continued

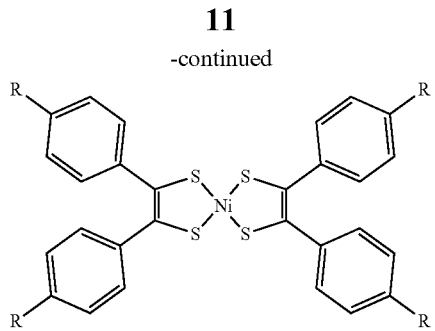

where R in the anthraquinone dyes or pigments may be hydrogen or any $C_1$-$C_8$ alkyl group (including substituted alkyl and unsubstituted alkyl), and R in the dithiolene may be hydrogen, COOH, $SO_3$, $NH_2$, any $C_1$-$C_8$ alkyl group (including substituted alkyl and unsubstituted alkyl), or the like.

Cyanine dyes or pigments and perylenediimide dyes or pigments may have the following structures, respectively:

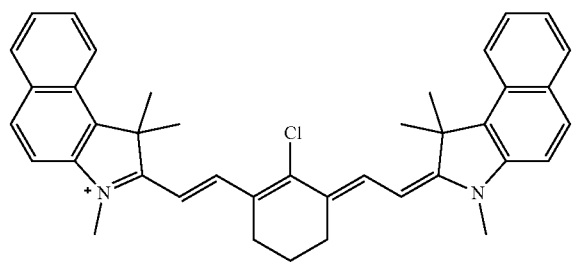

Cyanine dyes/pigments

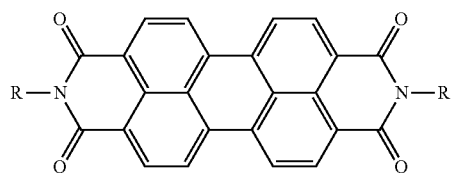

Perylenediimide dyes/pigments where R in the perylenediimide dyes or pigments may be hydrogen or any $C_1$-$C_8$ alkyl group (including substituted alkyl and unsubstituted alkyl).

Croconium dyes or pigments and pyrilium or thiopyrilium dyes or pigments may have the following structures, respectively:

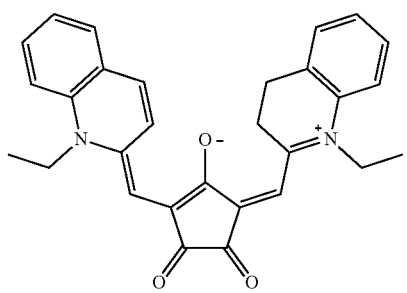

Croconium dyes/pigments

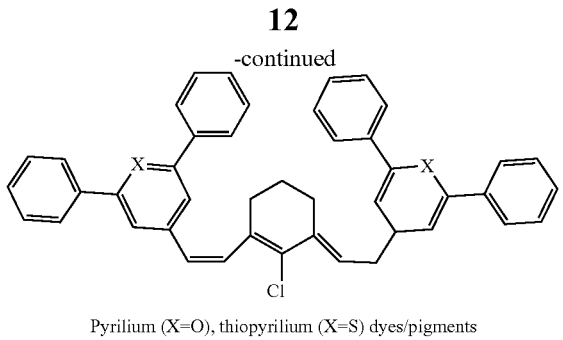

Pyrilium (X=O), thiopyrilium (X=S) dyes/pigments

Boron-dipyrromethene dyes or pigments and aza-boron-dipyrromethene dyes or pigments may have the following structures, respectively:

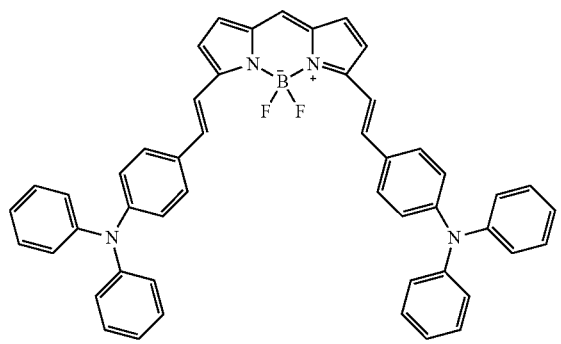

boron-dipyrromethene dyes/pigments

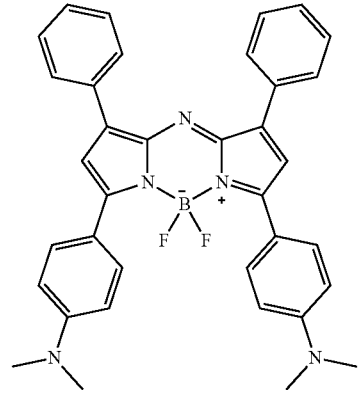

aza-boron-dipyrromethene dyes/pigments

Other suitable near-infrared absorbing dyes may include aminium dyes, tetraaryldiamine dyes, phthalocyanine dyes, and others.

Other near infrared absorbing materials include conjugated polymers (i.e., a polymer that has a backbone with alternating double and single bonds), such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof.

The amount of the electromagnetic radiation absorber/energy absorber/active material that is present in the core fusing agent ranges from greater than 0 wt % active to about 40 wt % active based on the total weight of the core fusing agent. In other examples, the amount of the active material in the core fusing agent ranges from about 0.3 wt % active to 30 wt % active, from about 1 wt % active to about 20 wt % active, from about 1.0 wt % active up to about 10.0 wt % active, or from greater than 4.0 wt % active up to about 15.0 wt % active. It is believed that these active material loadings provide a balance between the core fusing agent having jetting reliability and heat and/or radiation absorbance efficiency.

Primer Fusing Agent

Some examples of the primer fusing agent are dispersions including the electromagnetic radiation absorber that has absorption at wavelengths ranging from 800 nm to 4000 nm and transparency at wavelengths ranging from 400 nm to 780 nm. The absorption of this electromagnetic radiation absorber is the result of plasmonic resonance effects. Electrons associated with the atoms of the electromagnetic radiation absorber may be collectively excited by radiation, which results in collective oscillation of the electrons. The wavelengths that can excite and oscillate these electrons collectively are dependent on the number of electrons present in the electromagnetic radiation absorber particles, which in turn is dependent on the size of the electromagnetic radiation absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the primer fusing agent to be inkjet jettable as well as electromagnetically selective (e.g., having absorption at wavelengths ranging from 800 nm to 4000 nm and transparency at wavelengths ranging from 400 nm to 780 nm).

In an example, the electromagnetic radiation absorber of the primer fusing agent has an average particle diameter (e.g., volume-weighted mean diameter) ranging from greater than 0 nm to less than 220 nm. In another example, the electromagnetic radiation absorber has an average particle diameter ranging from greater than 0 nm to 120 nm. In a still another example, the electromagnetic radiation absorber has an average particle diameter ranging from about 10 nm to about 200 nm.

In an example, the electromagnetic radiation absorber of the primer fusing agent is an inorganic pigment. Examples of suitable inorganic pigments include lanthanum hexaboride ($LaB_6$), tungsten bronzes ($A_xWO_3$), indium tin oxide ($In_2O_3$:$SnO_2$, ITO), antimony tin oxide ($Sb_2O_3$:$SnO_2$, ATO), titanium nitride (TiN), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), modified copper phosphates ($A_xCu_yPO_z$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the electromagnetic radiation absorber that is present in the primer fusing agent ranges from greater than 0 wt % active to about 40 wt % active based on the total weight of the primer fusing agent. In other examples, the amount of the electromagnetic radiation absorber in the primer fusing agent ranges from about 0.3 wt % active to 30 wt % active, from about 1 wt % active to about 20 wt % active, from about 1.0 wt % active up to about 10.0 wt % active, or from greater than 4.0 wt % active up to about 15.0 wt % active. It is believed that these electromagnetic radiation absorber loadings provide a balance between the primer fusing agent having jetting reliability and heat and/or radiation absorbance efficiency.

The electromagnetic radiation absorber of the primer fusing agent may, in some instances, be dispersed with a dispersant. As such, the dispersant helps to uniformly distribute the electromagnetic radiation absorber throughout the primer fusing agent. Examples of suitable dispersants include polymer or small molecule dispersants, charged groups attached to the electromagnetic radiation absorber surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the primer fusing agent may range from about 10 wt % to about 200 wt % based on the weight of the electromagnetic radiation absorber in the primer fusing agent.

A silane coupling agent may also be added to the primer fusing agent to help bond the organic (e.g., dispersant) and inorganic (e.g., pigment) materials. Examples of suitable silane coupling agents include the SILQUEST® A series manufactured by Momentive.

Whether a single silane coupling agent is used or a combination of silane coupling agents is used, the total amount of silane coupling agent(s) in the primer fusing agent may range from about 0.1 wt % to about 50 wt % based on the weight of the electromagnetic radiation absorber in the primer fusing agent. In an example, the total amount of silane coupling agent(s) in the primer fusing agent ranges from about 1 wt % to about 30 wt % based on the weight of the electromagnetic radiation absorber. In another example, the total amount of silane coupling agent(s) in the primer fusing agent ranges from about 2.5 wt % to about 25 wt % based on the weight of the electromagnetic radiation absorber.

One example of the primer fusing agent includes cesium tungsten oxide (CTO) nanoparticles as the electromagnetic radiation absorber. The CTO nanoparticles have a formula of $Cs_xWO_3$, where $0<x<1$. The cesium tungsten oxide nanoparticles may give the primer fusing agent a light blue color. The strength of the color may depend, at least in part, on the amount of the CTO nanoparticles in the primer fusing agent. When it is desirable to form an outer white layer on the 3D object, less of the CTO nanoparticles may be used in the primer fusing agent in order to achieve the white color. In an example, the CTO nanoparticles may be present in the primer fusing agent in an amount ranging from about 1 wt % to about 20 wt % (based on the total weight of the primer fusing agent).

The average particle size of the CTO nanoparticles may range from about 1 nm to about 40 nm. The term "average particle size", as used herein, may refer to a number-weighted mean diameter or a volume-weighted mean diameter of a particle distribution. In some examples, the average particle size of the CTO nanoparticles may range from about 1 nm to about 15 nm or from about 1 nm to about 10 nm. The upper end of the particle size range (e.g., from about 30 nm to about 40 nm) may be less desirable, as these particles may be more difficult to stabilize.

This example of the primer fusing agent may also include a zwitterionic stabilizer. The zwitterionic stabilizer may improve the stabilization of this example of the primer fusing agent. While the zwitterionic stabilizer has an overall neutral charge, at least one area of the molecule has a positive charge (e.g., amino groups) and at least one other area of the molecule has a negative charge. The CTO nanoparticles may have a slight negative charge. The zwitterionic stabilizer molecules may orient around the slightly negative CTO nanoparticles with the positive area of the zwitterionic stabilizer molecules closest to the CTO nanoparticles and the negative area of the zwitterionic stabilizer molecules furthest away from the CTO nanoparticles. Then, the negative charge of the negative area of the zwitterionic stabilizer molecules may repel CTO nanoparticles from each other. The zwitterionic stabilizer molecules may form a protective layer around the CTO nanoparticles, and prevent them from coming into direct contact with each other and/or increase the distance between the particle surfaces (e.g., by a distance ranging from about 1 nm to about 2 nm). Thus, the zwitterionic stabilizer may prevent the CTO nanoparticles from agglomerating and/or settling in the primer fusing agent.

Examples of suitable zwitterionic stabilizers include $C_2$ to $C_8$ betaines, $C_2$ to $C_8$ aminocarboxylic acids having a solubility of at least 10 g in 100 g of water, taurine, and combinations thereof. Examples of the $C_2$ to $C_8$ aminocarboxylic acids include beta-alanine, gamma-am inobutyric acid, glycine, and combinations thereof.

The zwitterionic stabilizer may be present in the primer fusing agent in an amount ranging from about 2 wt % to about 35 wt % (based on the total weight of the primer fusing agent). When the zwitterionic stabilizer is the $C_2$ to $C_8$ betaine, the $C_2$ to $C_8$ betaine may be present in an amount ranging from about 8 wt % to about 35 wt % of the total weight of the primer fusing agent. When the zwitterionic stabilizer is the $C_2$ to $C_8$ aminocarboxylic acid, the $C_2$ to $C_8$ aminocarboxylic acid may be present in an amount ranging from about 2 wt % to about 20 wt % of the total weight of the primer fusing agent. When the zwitterionic stabilizer is taurine, taurine may be present in an amount ranging from about 2 wt % to about 35 wt % of the total weight of the primer fusing agent.

In this example, the weight ratio of the CTO nanoparticles to the zwitterionic stabilizer may range from 1:10 to 10:1; or the weight ratio of the CTO nanoparticles to the zwitterionic stabilizer may be 1:1.

Vehicle for Fusing Agents

Any example of the fusing agent (core or primer fusing agent) includes a liquid vehicle. The fusing agent vehicle, or "FA vehicle," may refer to the liquid in which the electromagnetic radiation absorber is/are dispersed or dissolved to form the respective fusing agent. A wide variety of FA vehicles, including aqueous and non-aqueous vehicles, may be used in the fusing agents. In some examples, the FA vehicle may include water alone or a non-aqueous solvent alone with no other components. In other examples, the FA vehicle may include other components, depending, in part, upon the applicator that is to be used to dispense the fusing agent. Examples of other suitable fusing agent components include co-solvent(s), humectant(s), surfactant(s), antimicrobial agent(s), anti-kogation agent(s), and/or chelating agent(s).

Classes of water soluble or water miscible organic co-solvents that may be used in the fusing agents include aliphatic alcohols, aromatic alcohols, diols, glycol ethers, polyglycol ethers, lactams, formamides (substituted and unsubstituted), acetamides (substituted and unsubstituted), glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,2-propanediol, 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, 2-pyrrolidone, 1-methyl-2-pyrrolidone, 1-(2-hydroxyethyl)-2-pyrrolidone, and the like. Other examples of organic co-solvents include dimethyl sulfoxide (DMSO), isopropyl alcohol, ethanol, pentanol, acetone, or the like.

The co-solvent(s) may be present in the fusing agent in a total amount ranging from about 1 wt % to about 20 wt % based upon the total weight of the fusing agent. In an example, the antioxidant formulation includes from about 2 wt % to about 15 wt %, or from about 5 wt % to about 10 wt % of the co-solvent(s).

The FA vehicle may also include humectant(s). An example of a suitable humectant is ethoxylated glycerin having the following formula:

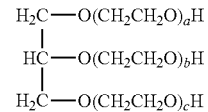

in which the total of a+b+c ranges from about 5 to about 60, or in other examples, from about 20 to about 30. An example of the ethoxylated glycerin is LIPONIC® EG-1 (LEG-1, glycereth-26, a+b+c=26, available from Lipo Chemicals).

In an example, the total amount of the humectant(s) present in the fusing agent ranges from about 3 wt % active to about 10 wt % active, based on the total weight of the fusing agent.

It is to be understood that any of the surfactant(s) described herein for the build material reactive functional agent may be used in any examples of the fusing agent in any of the amounts provided, except that the percentages will be with respect to the total weight of the fusing agent.

The FA vehicle may also include antimicrobial agent(s). Antimicrobial agents are also known as biocides and/or fungicides. Examples of suitable antimicrobial agents include the NUOSEPT® (Ashland Inc.), UCARCIDE™ or KORDEK™ or ROCIMA™ (The Dow Chemical Company), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT) and Bronopol) (Thor Chemicals), AXIDE™

(Planet Chemical), NIPACIDE™ (Clariant), blends of 5-chloro-2-methyl-4-isothiazolin-3-one (CIT or CMIT) and MIT under the tradename KATHON™ (The Dow Chemical Company), and combinations thereof.

In an example, the total amount of antimicrobial agent(s) in the fusing agent ranges from about 0.01 wt % active to about 0.05 wt % active (based on the total weight of the fusing agent). In another example, the total amount of antimicrobial agent(s) in the fusing agent is about 0.04 wt % active (based on the total weight of the fusing agent).

The FA vehicle may also include anti-kogation agent(s) that is/are to be jetted using thermal inkjet printing. Kogation refers to the deposit of dried printing liquid (e.g., fusing agent) on a heating element of a thermal inkjet printhead. Anti-kogation agent(s) is/are included to assist in preventing the buildup of kogation.

Examples of suitable anti-kogation agents include oleth-3-phosphate (commercially available as CRODAFOS™ O3A or CRODAFOS™ N-3A) or dextran 500k. Other suitable examples of the anti-kogation agents include CRODAFOS™ HCE (phosphate-ester from Croda Int.), CRODAFOS® O10A (oleth-10-phosphate from Croda Int.), or DISPERSOGEN® LFH (polymeric dispersing agent with aromatic anchoring groups, acid form, anionic, from Clariant), etc. It is to be understood that any combination of the anti-kogation agents listed may be used.

The anti-kogation agent may be present in the fusing agent in an amount ranging from about 0.1 wt % active to about 1.5 wt % active, based on the total weight of the fusing agent. In an example, the anti-kogation agent is present in an amount of about 0.5 wt % active, based on the total weight of the fusing agent.

Chelating agents (or sequestering agents) may be included in the aqueous liquid vehicle of the fusing agent to eliminate the deleterious effects of heavy metal impurities. In an example, the chelating agent is selected from the group consisting of methylglycinediacetic acid, trisodium salt; 4,5-dihydroxy-1,3-benzenedisulfonic acid disodium salt monohydrate; ethylenediaminetetraacetic acid (EDTA); hexamethylenediamine tetra(methylene phosphonic acid), potassium salt; and combinations thereof. Methylglycinediacetic acid, trisodium salt (Na3MGDA) is commercially available as TRILON® M from BASF Corp. 4,5-dihydroxy-1,3-benzenedisulfonic acid disodium salt monohydrate is commercially available as TIRON™ monohydrate. Hexamethylenediamine tetra(methylene phosphonic acid), potassium salt is commercially available as DEQUEST® 2054 from Italmatch Chemicals.

Whether a single chelating agent is used or a combination of chelating agents is used, the total amount of chelating agent(s) in the fusing agent may range from greater than 0 wt % active to about 0.5 wt % active based on the total weight of the fusing agent. In an example, the chelating agent is present in an amount ranging from about 0.05 wt % active to about 0.2 wt % active based on the total weight of fusing agent. In another example, the chelating agent(s) is/are present in the fusing agent in an amount of about 0.05 wt % active (based on the total weight of the fusing agent).

The balance of the fusing agent(s) is water (e.g., deionized water, purified water, etc.), which as described herein, may vary depending upon the other components in the fusing agent(s).

Detailing Agent

Some examples of the multi-fluid kit and/or 3D printing kit include a detailing agent. The detailing agent may include a surfactant, a co-solvent, and a balance of water. In some examples, the detailing agent consists of these components, and no other components. In some other examples, the detailing agent may further include a colorant. In still some other examples, the detailing agent consists of a colorant, a surfactant, a co-solvent, and a balance of water, with no other components. In yet some other examples, the detailing agent may further include additional components, such as anti-kogation agent(s), antimicrobial agent(s), and/or chelating agent(s) (each of which is described above in reference to the fusing agent).

The surfactant(s) that may be used in the detailing agent include any of the surfactants listed herein in reference to the build material reactive functional agent. The total amount of surfactant(s) in the detailing agent may range from about 0.10 wt % to about 5.00 wt % with respect to the total weight of the detailing agent.

The co-solvent(s) that may be used in the detailing agent include any of the co-solvents listed above in reference to the fusing agent. The total amount of co-solvent(s) in the detailing agent may range from about 1 wt % to about 65 wt % with respect to the total weight of the detailing agent.

In some examples, the detailing agent does not include a colorant. In these examples, the detailing agent may be colorless. As used herein, "colorless," means that the detailing agent is achromatic and does not include a colorant.

When the detailing agent includes the colorant, the colorant may be a dye of any color having substantially no absorbance in a range of 650 nm to 2500 nm. By "substantially no absorbance" it is meant that the dye absorbs no radiation having wavelengths in a range of 650 nm to 2500 nm, or that the dye absorbs less than 10% of radiation having wavelengths in a range of 650 nm to 2500 nm. The dye may also be capable of absorbing radiation with wavelengths of 650 nm or less. As such, the dye absorbs at least some wavelengths within the visible spectrum, but absorbs little or no wavelengths within the near-infrared spectrum. This is in contrast to the active (energy absorbing) material in the fusing agent, which absorbs wavelengths within the near-infrared spectrum. As such, the colorant in the detailing agent will not substantially absorb the fusing radiation, and thus will not initiate melting and fusing (coalescence) of the build material composition in contact therewith when the build material layer is exposed to the energy.

It may be desirable to add color to the detailing agent when the detailing agent is applied to the edge of a colored part. Color in the detailing agent may be desirable when used at a part edge because some of the colorant may become embedded in the polyamide build material that fuses/coalesces at the edge. As such, in some examples, the dye in the detailing agent may be selected so that its color matches the color of the active material in the fusing agent. As examples, the dye may be any azo dye having sodium or potassium counter ion(s) or any diazo (i.e., double azo) dye having sodium or potassium counter ion(s), where the color of azo or dye azo dye matches the color of the fusing agent.

In an example, the dye is a black dye. Some examples of the black dye include azo dyes having sodium or potassium counter ion(s) and diazo (i.e., double azo) dyes having sodium or potassium counter ion(s). Examples of azo and diazo dyes may include tetrasodium (6Z)-4-acetamido-5-oxo-6-[[7-sulfonato-4-(4-sulfonatophenyl)azo-1-naphthyl]hydrazono]naphthalene-1,7-disulfonate with a chemical structure of:

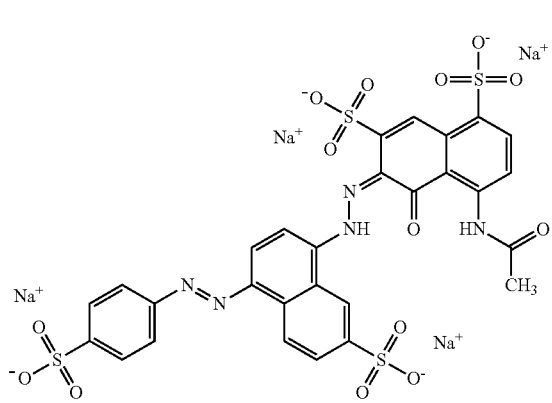 [SMILES: [Na+] ; CC(=O)Nc1ccc(S(=O)(=O)[O-])c2c1C(=O)/C(=N\Nc1ccc(/N=N/c3ccc(S(=O)(=O)[O-])cc3)c3ccc(S(=O)(=O)[O-])cc13)C(S(=O)(=O)[O-])=C2 ; [Na+] ; [Na+] ; [Na+]]

(commercially available as Food Black 1); tetrasodium 6-amino-4-hydroxy-3-[[7-sulfonato-4-[(4-sulfonatophenyl)azo]-1-naphthyl]azo]naphthalene-2,7-disulfonate with a chemical structure of:

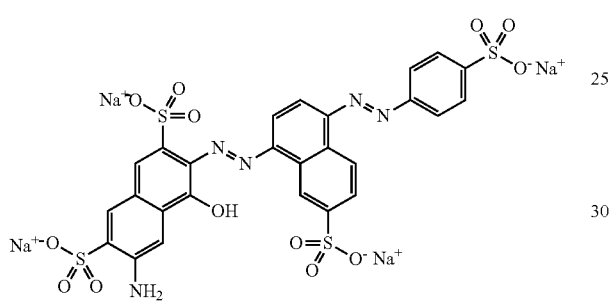

(commercially available as Food Black 2); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

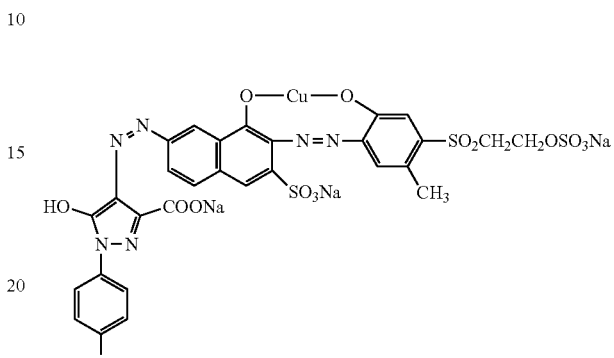

(commercially available as Reactive Black 31); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

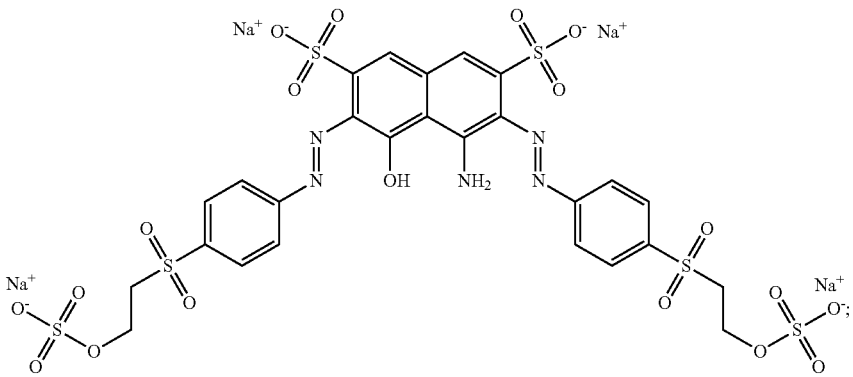

and combinations thereof. Some other commercially available examples of the dye used in the detailing agent include multipurpose black azo-dye based liquids, such as PRO-JET® Fast Black 1 (made available by Fujifilm Holdings), and black azo-dye based liquids with enhanced water fastness, such as PRO-JET® Fast Black 2 (made available by Fujifilm Holdings).

In some instances, in addition to the black dye, the colorant in the detailing agent may further include another dye. In an example, the other dye may be a cyan dye that is used in combination with any of the dyes disclosed herein. The other dye may also have substantially no absorbance above 650 nm. The other dye may be any colored dye that contributes to improving the hue and color uniformity of the final 3D part.

Some examples of the other dye include a salt, such as a sodium salt, an ammonium salt, or a potassium salt. Some specific examples include ethyl-[4-[[4-[ethyl-[(3-sulfophenyl) methyl] amino] phenyl]-(2-sulfophenyl) ethylidene]-1-cyclohexa-2,5-dienylidene]-[(3-sulfophenyl) methyl] azanium with a chemical structure of:

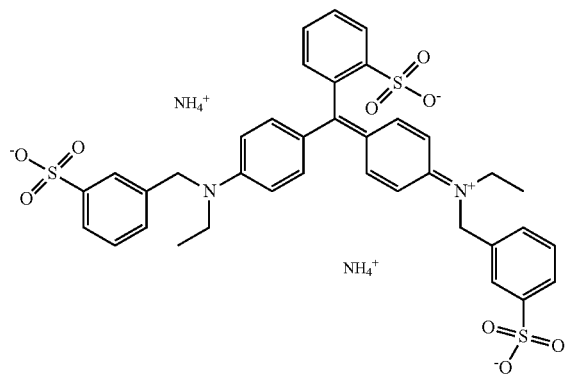

(commercially available as Acid Blue 9, where the counter ion may alternatively be sodium counter ions or potassium counter ions); sodium 4-[(E)-{4-[benzyl(ethyl)amino]phenyl}{(4E)-4-[benzyl(ethyl)iminio]cyclohexa-2,5-dien-1-ylidene}methyl]benzene-1,3-disulfonate with a chemical structure of:

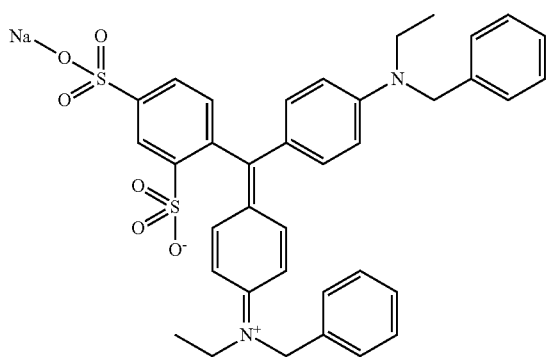

(commercially available as Acid Blue 7); and a phthalocyanine with a chemical structure of:

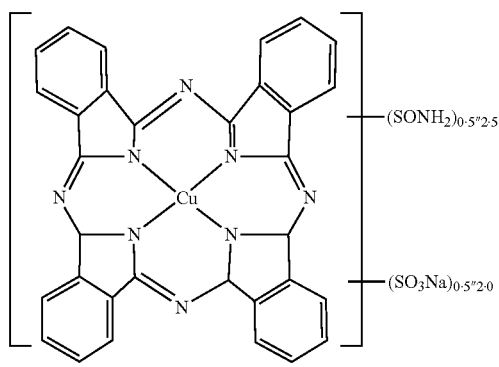

(commercially available as Direct Blue 199); and combinations thereof.

In an example of the detailing agent, the dye may be present in an amount ranging from about 1 wt % to about 3 wt % based on the total weight of the detailing agent. In another example of the detailing agent including a combination of dyes, one dye (e.g., the black dye) is present in an amount ranging from about 1.50 wt % to about 1.75 wt % based on the total weight of the detailing agent, and the other dye (e.g., the cyan dye) is present in an amount ranging from about 0.25 wt % to about 0.50 wt % based on the total weight of the detailing agent.

The balance of the detailing agent is water. As such, the amount of water may vary depending upon the amounts of the other components that are included.

Coloring Agent

Some examples of the multi-fluid kit and/or 3D printing kit include a coloring agent. The coloring agent may include a colorant, a co-solvent, and a balance of water. In some examples, the coloring agent consists of these components, and no other components. In some other examples, the coloring agent may further include a binder (e.g., an acrylic latex binder, which may be a copolymer of any two or more of styrene, acrylic acid, methacrylic acid, methyl methacrylate, ethyl methacrylate, and butyl methacrylate) and/or a buffer (described in reference to the build material reactive functional agent). In still other examples, the coloring agent may further include additional components, such as dispersant(s), humectant(s), surfactant(s), anti-kogation agent(s), antimicrobial agent(s), and/or chelating agent(s) (each of which is described herein in reference to the build material reactive functional agent and/or fusing agents).

The coloring agent may be a black agent, a cyan agent, a magenta agent, or a yellow agent. As such, the colorant may be a black colorant, a cyan colorant, a magenta colorant, a yellow colorant, or a combination of colorants that together achieve a black, cyan, magenta, or yellow color.

In some instances, the colorant of the coloring agent may be transparent to infrared wavelengths. In other instances, the colorant of the coloring agent may not be completely transparent to infrared wavelengths, but does not absorb enough radiation to sufficiently heat the build material composition in contact therewith. In an example, the colorant absorbs less than 10% of radiation having wavelengths in a range of 650 nm to 2500 nm. In another example, the colorant absorbs less than 20% of radiation having wavelengths in a range of 650 nm to 4000 nm.

The colorant of the coloring agent is also capable of absorbing radiation with wavelengths of 650 nm or less. As such, the colorant absorbs at least some wavelengths within the visible spectrum, but absorbs little or no wavelengths within the near-infrared spectrum. This is in contrast to at least some examples of the electromagnetic radiation absorber in the fusing agent, which absorbs wavelengths within the near-infrared spectrum and/or the infrared spectrum. As such, the colorant in the coloring agent will not substantially absorb the fusing radiation, and thus will not initiate coalescing/fusing of the build material composition in contact therewith when the build material composition is exposed to energy.

Examples of IR transparent colorants include acid yellow 23 (AY 23), AY17, acid red 52 (AR 52), AR 289, and reactive red 180 (RR 180). Examples of colorants that absorb some visible wavelengths and some IR wavelengths include cyan colorants, such as direct blue 199 (DB 199) and pigment blue 15:3 (PB 15:3).

In other examples, the colorant may be any azo dye having sodium or potassium counter ion(s) or any diazo (i.e., double azo) dye having sodium or potassium counter ion(s), such as those described herein for the detailing agent.

An example of the pigment based coloring agent may include from about 1 wt % to about 10 wt % of pigment(s), from about 10 wt % to about 30 wt % of co-solvent(s), from about 1 wt % to about 10 wt % of dispersant(s), from about 0.1 wt % to about 5 wt % of binder(s), from 0.01 wt % to about 1 wt % of anti-kogation agent(s), from about 0.05 wt % to about 0.1 wt % antimicrobial agent(s), and a balance of water. An example of the dye based coloring agent may include from about 1 wt % to about 7 wt % of dye(s), from about 10 wt % to about 30 wt % of co-solvent(s), from about 1 wt % to about 7 wt % of dispersant(s), from about 0.05 wt % to about 0.1 wt % antimicrobial agent(s), from 0.05 wt % to about 0.1 wt % of chelating agent(s), from about 0.005 wt % to about 0.2 wt % of buffer(s), and a balance of water.

Some examples of the coloring agent include a set of cyan, magenta, and yellow agents, such as C1893A (cyan), C1984A (magenta), and C1985A (yellow); or C4801A (cyan), C4802A (magenta), and C4803A (yellow); all of which are available from HP Inc. Other commercially available coloring agents 18 include C9384A (printhead HP72), C9383A (printhead HP72), C4901A (printhead HP 940), and C4900A (printhead HP 940).

Printing Methods and Methods of Use

Different examples of the 3D printing method are shown and described in reference to FIG. 2 through FIG. 8.

Prior to execution of any examples of the method, it is to be understood that a controller may access data stored in a data store pertaining to a 3D part/object that is to be printed. For example, the controller may determine the number of layers of the build material composition that are to be formed, the locations at which any of the agents is/are to be deposited on each of the respective layers, etc.

Polyamide Build Material Composition

The polyamide build material composition includes a polyamide build material. Examples of suitable polyamides include polyamide-11 (PA 11/nylon 11), polyamide-12 (PA 12/nylon 12), polyamide-6 (PA 6/nylon 6), polyamide-8 (PA 8/nylon 8), polyamide-9 (PA 9/nylon 9), polyamide-66 (PA 66/nylon 66), polyamide-612 (PA 612/nylon 612), polyamide-812 (PA 812/nylon 812), polyamide-912 (PA 912/nylon 912), etc.), a thermoplastic polyamide (TPA), and combinations thereof.

In some examples, the polyamide build material may be in the form of a powder or a powder-like material. The powder-like material includes, for example, short fibers having a length that is greater than its width. In some examples, the powder or powder-like material may be formed from, or may include, short fibers that may, for example, have been cut into short lengths from long strands or threads of material.

The polyamide build material may be made up of similarly sized particles and/or differently sized particles. In an example, the average particle size (e.g., volume-weighted mean diameter of a particle distribution) of the polymeric build material 16 ranges from about 2 µm to about 225 µm. In another example, the average particle size of the polymeric build material 16 ranges from about 10 µm to about 130 µm.

When the polyamide build material is a crystalline or semi-crystalline material, the polymer may have a wide processing window of greater than 5° C., which can be defined by the temperature range between the melting point and the re-crystallization temperature. In an example, the polyamide may have a melting point ranging from about 50° C. to about 300° C. As other examples, the polyamide may have a melting point ranging from about 155° C. to about 225° C., from about 155° C. to about 215° C., about 160° C. to about 200° C., from about 170° C. to about 190° C., or from about 182° C. to about 189° C. As still another example, the polyamide may have a melting point of about 180° C.

When the polyamide build material is thermoplastic polyamide, the thermoplastic polyamide may have a melting range within the range of from about 130° C. to about 250° C.

In some examples, the polyamide build material does not substantially absorb radiation having a wavelength within the range of 300 nm to 1400 nm. The phrase "does not substantially absorb" means that the absorptivity of the polyamide build material at a particular wavelength is 25% or less (e.g., 20%, 10%, 5%, etc.)

In some examples, in addition to the polyamide build material, the build material composition may include an antioxidant, a whitener, an antistatic agent, a flow aid, or a combination thereof. While several examples of these additives are provided, it is to be understood that these additives are selected to be thermally stable (i.e., will not decompose) at the 3D printing temperatures.

Antioxidant(s) may be added to the build material composition to prevent or slow molecular weight decreases of the polyamide build material and/or to prevent or slow discoloration (e.g., yellowing) of the polymeric build material by preventing or slowing oxidation of the polyamide build material. In some examples, the polyamide build material may discolor upon reacting with oxygen, and this discoloration may contribute to the discoloration of the build material composition. The antioxidant may be selected to minimize discoloration. In some examples, the antioxidant may be a radical scavenger. In these examples, the antioxidant may include IRGANOX® 1098 (benzenepropanamide, N,N'-1,6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). The antioxidant may be in the form of fine particles (e.g., having an average particle size of 5 µm or less) that are dry blended with the polymeric build material 16. In an example, the antioxidant may be included in the build material composition in an amount ranging from about 0.01 wt % to about 5 wt %, based on the total weight of the build material composition. In other examples, the antioxidant may be included in the build material composition in an amount ranging from about 0.01 wt % to about 2 wt % or from about 0.2 wt % to about 1 wt %, based on the total weight of the build material composition.

Whitener(s) may be added to the build material composition to improve visibility. Examples of suitable whiteners include titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), boron nitride (BN), and combinations thereof. In some examples, a stilbene derivative may be used as the whitener and a brightener. In these examples, the temperature(s) of the 3D printing process may be selected so that the stilbene derivative remains stable (i.e., the 3D printing temperature does not thermally decompose the stilbene derivative). In an example, any example of the whitener may be included in the build material composition in an amount ranging from greater than 0 wt % to about 10 wt %, based on the total weight of the build material composition.

Antistatic agent(s) may be added to the polyamide build material to suppress tribo-charging. Examples of suitable antistatic agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available antistatic agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the antistatic agent is added in an amount ranging from greater than 0 wt % to less than 5 wt %, based upon the total weight of the build material composition.

Flow aid(s) may be added to improve the coating flowability of the build material composition. Flow aids may be particularly beneficial when the build material composition has an average particle size less than 25 μm. The flow aid improves the flowability of the build material composition by reducing the friction, the lateral drag, and the tribocharge buildup (by increasing the particle conductivity). Examples of suitable flow aids include aluminum oxide ($Al_2O_3$), tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), and polydimethylsiloxane (E900). In an example, the flow aid is added in an amount ranging from greater than 0 wt % to less than 5 wt %, based upon the total weight of the build material composition.

Printing with the Build Material Reactive Functional Agent and One Fusing Agent

Figure 2:
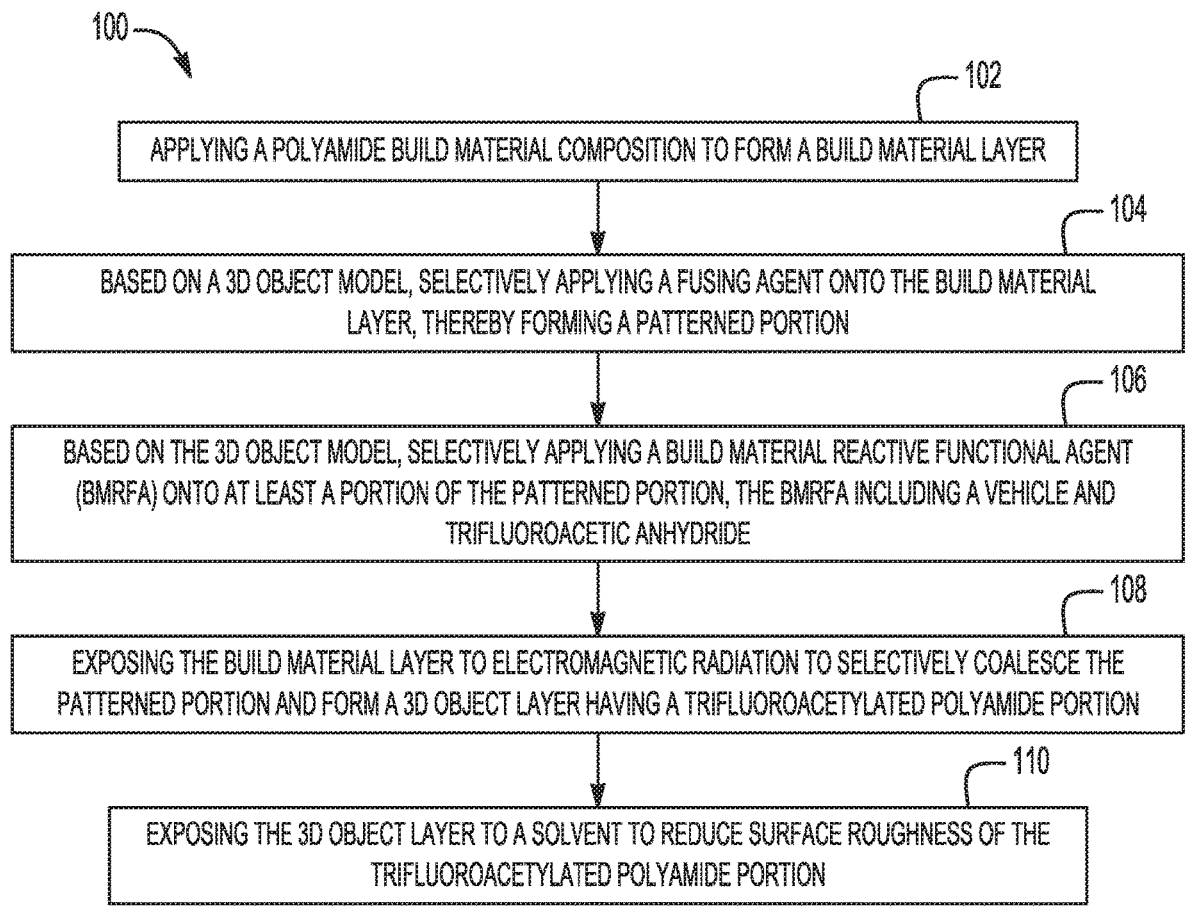
FIG. 2 is a flow diagram depicting an example of a 3D printing method.
Figure 3:
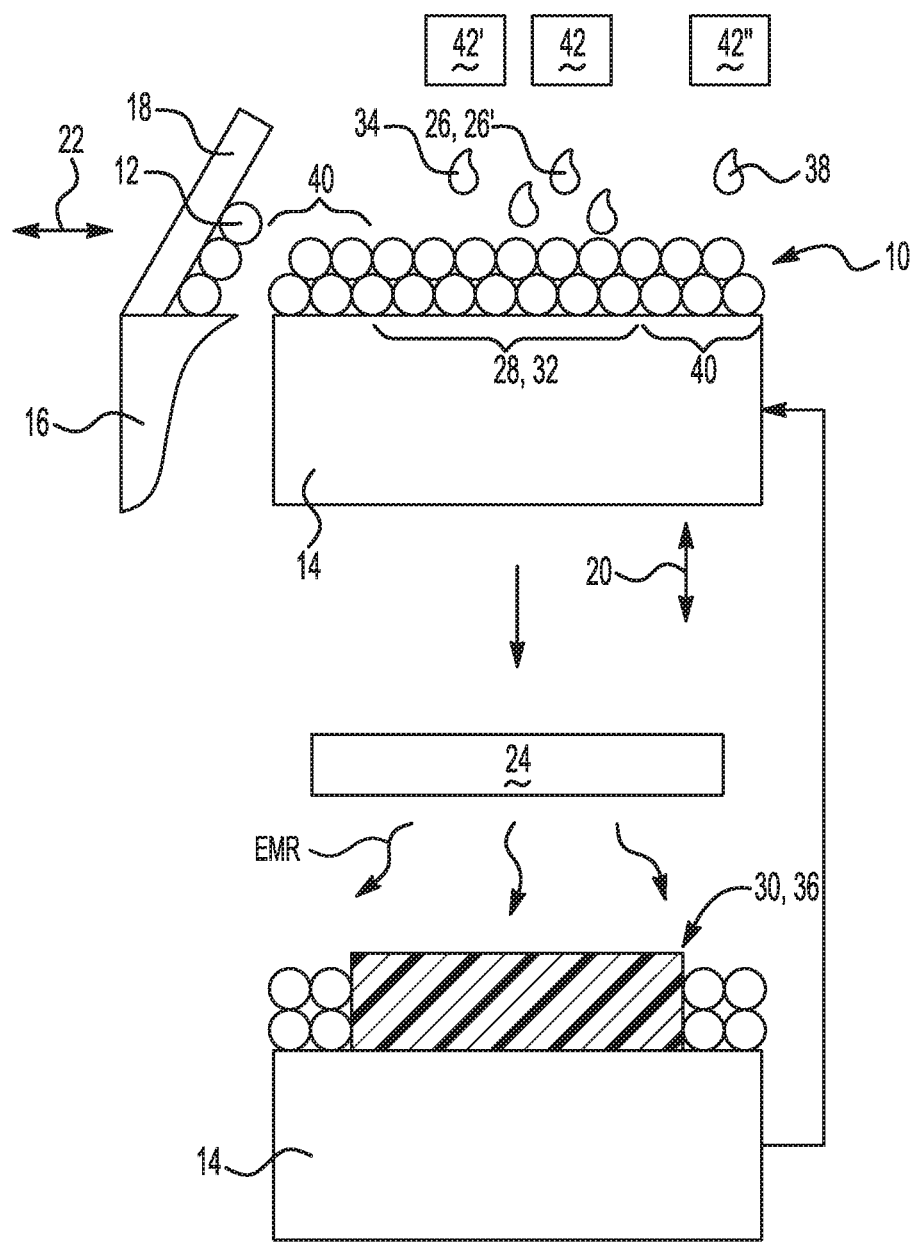
FIG. 3 is a schematic illustration of one example of the 3D printing method of FIG. 2.

Referring now to FIG. 2 and FIG. 3, an example of the method 100 which utilizes the build material reactive functional agent and one of the fusing agents is depicted.

The method 100 shown in FIG. 2 includes applying a polyamide build material composition to form a build material layer (reference numeral 102); based on a 3D object model, selectively applying a fusing agent onto the build material layer, thereby forming a patterned portion (reference numeral 104); based on the 3D object model, selectively applying a build material reactive functional agent (BMRFA) onto at least a portion of the patterned portion, the BMRFA including water and trifluoroacetic anhydride (reference numeral 106); exposing the build material layer to electromagnetic radiation to selectively coalesce the patterned portion and form a 3D object layer having a trifluoroacetylated polyamide portion (reference numeral 108); and exposing the 3D object layer to a solvent to reduce a surface roughness of the trifluoroacetylated polyamide portion (reference numeral 110).

The method 100 is shown schematically in FIG. 3. In FIG. 3, a layer 10 of the polyamide build material composition 12 is applied on a build area platform 14. A printing system may be used to apply the polyamide build material composition 12. The printing system may include the build area platform 14, a build material supply 16 containing the build material composition 12, and a build material distributor 18.

The build area platform 14 receives the polyamide build material composition 12 from the build material supply 16. The build area platform 14 may be moved in the directions as denoted by the arrow 20, e.g., along the z-axis, so that the build material composition 12 may be delivered to the build area platform 14 or to a previously formed layer. In an example, when the polyamide build material composition 12 is to be delivered, the build area platform 14 may be programmed to advance (e.g., downward) enough so that the build material distributor 18 can push the build material composition 12 onto the build area platform 14 to form a substantially uniform layer 10 of the build material composition 12 thereon. The build area platform 14 may also be returned to its original position, for example, when a new part is to be built.

The build material supply 16 may be a container, bed, or other surface that is to position the build material composition 12 between the build material distributor 18 and the build area platform 14. The build material supply 16 may include heaters so that the build material composition 12 is heated to a supply temperature ranging from about 25° C. to about 150° C. In these examples, the supply temperature may depend, in part, on the build material composition 12 used and/or the 3D printer used. As such, the range provided is one example, and higher or lower temperatures may be used.

The build material distributor 18 may be moved in the directions as denoted by the arrow 22, e.g., along the y-axis, over the build material supply 16 and across the build area platform 14 to spread the layer 10 of the polyamide build material composition 12 over the build area platform 14. The build material distributor 18 may also be returned to a position adjacent to the build material supply 16 following the spreading of the polyamide build material composition 12. The build material distributor 18 may be a blade (e.g., a doctor blade), a roller, a combination of a roller and a blade, and/or any other device capable of spreading the build material composition 12 over the build area platform 14. For instance, the build material distributor 18 may be a counter-rotating roller. In some examples, the build material supply 16 or a portion of the build material supply 16 may translate along with the build material distributor 18 such that polyamide build material composition 12 is delivered continuously to the build area platform 14 rather than being supplied from a single location at the side of the printing system as depicted in FIG. 3.

The build material supply 16 may supply the polyamide build material composition 12 into a position so that it is ready to be spread onto the build area platform 14. The build material distributor 18 may spread the supplied build material composition 12 onto the build area platform 14. The controller (not shown) may process "control build material supply" data, and in response, control the build material supply 16 to appropriately position the particles of the build material composition 12, and may process "control spreader" data, and in response, control the build material distributor 18 to spread the polyamide build material composition 12 over the build area platform 14 to form the layer 10 of the polyamide build material composition 12 thereon. In FIG. 3, one build material layer 10 has been formed.

The layer 10 has a substantially uniform thickness across the build area platform 14. In an example, the build material layer 10 has a thickness ranging from about 50 μm to about 120 μm. In another example, the thickness of the build material layer 26 ranges from about 30 μm to about 300 μm. It is to be understood that thinner or thicker layers may also be used. For example, the thickness of the build material layer 10 may range from about 20 μm to about 500 μm. The layer thickness may be about 2× (i.e., 2 times) the average diameter of the build material composition particles at a minimum for finer part definition. In some examples, the layer thickness may be about 1.2× the average diameter of the build material composition particles.

After the polyamide build material composition 12 has been applied, and prior to further processing, the build material layer 10 may be exposed to heating. In an example, the heating temperature may be below the melting point or melting range of the polyamide material of the build material composition 12. As examples, the pre-heating temperature may range from about 5° C. to about 50° C. below the melting point or the lowest temperature of the melting range of the polyamide material. In an example, the pre-heating temperature ranges from about 50° C. to about 205° C. In still another example, the pre-heating temperature ranges from about 100° C. to about 190° C. It is to be understood that the pre-heating temperature may depend, in part, on the build material composition 12 used. As such, the ranges provided are some examples, and higher or lower temperatures may be used.

Pre-heating the layer 10 may be accomplished by using any suitable heat source that exposes all of the polyamide build material composition 12 in the layer 10 to the heat. Examples of the heat source include a thermal heat source (e.g., a heater (not shown) integrated into the build area platform 14 (which may include sidewalls)) or a radiation source 24.

After the layer 10 is formed, and in some instances is pre-heated, the fusing agent(s) 26 or 26' is selectively applied on at least some of the polyamide build material composition 12 in the layer 10 to form a patterned portion 28.

To form a layer 30 of a 3D object, at least a portion (e.g., patterned portion 28) of the layer 10 of the build material composition 12 is patterned with the fusing agent 26, 26'. Either fusing agent 26 or 26' may be used. When it is desirable to form a white, colored, or slightly tinted object layer 30, the primer fusing agent 26' may be used to pattern the polyamide build material composition 12. The primer fusing agent 26' is clear or slightly tinted, and thus the resulting 3D object layer 30 may appear white or the color of the build material composition 12. When it is desirable to form a darker color or black object layer 30, the core fusing agent 26 may be used. The core fusing agent 26 is dark or black, and thus the resulting 3D object layer 30 may appear grey, black or another dark color. In other examples of the method (e.g., method 200 shown in FIG. 4 and FIG. 5) the two fusing agents 26, 26' may be used to pattern different portions of a single build material layer 10, which will be described further in reference to FIG. 4 and FIG. 5. Color may also be added by using the coloring agent (not shown), which will also be described further in reference to FIG. 8.

The volume of the fusing agent 26, 26' that is applied per unit of the polyamide build material composition 12 in the patterned portion 28 may be sufficient to absorb and convert enough electromagnetic radiation so that the polyamide build material composition 12 in the patterned portion 28 will coalesce/fuse. The volume of the fusing agent 26, 26' that is applied per unit of the polyamide build material composition 12 may depend, at least in part, on the electromagnetic radiation absorber used, the electromagnetic radiation absorber loading in the fusing agent 26, 26', and the polyamide material in the build material composition 12.

To render at least a portion of the layer 30 of the 3D object more polar and more soluble, for example, in a post-processing solvent that is to be used, corresponding portion(s) 32 of the patterned portion 28 is/are also patterned with the BMRFA 34. The BMRFA 34 may be applied in accordance with 3D object model wherever it is desirable for the final 3D object layer 30 to exhibit the increased polarity and solubility. Utilizing a BMRFA 34 that is separate from the fusing agent 26, 26' enables 3D objects with tailored higher solubility areas to be formed. For example, the BMRFA 34 may not be applied to interior portion(s) 28 of the layer 10 so the resulting part of the 3D object remains strong and relatively insoluble, and the BMRFA 34 may be applied to the outermost portion(s) 28 of the layer 10 so the resulting part of the 3D object is modified to exhibit increased solubility and can be readily smoothed when exposed to the post-processing solvent. In the example shown in FIG. 3, the 3D object layer 30 is an outermost layer, and thus forms one surface of the 3D object. The BMRFA 34 is applied to form the modified (trifluoroacetylated) polyamide and impart solubility to this surface of the 3D object.

The volume of the BMRFA 34 that is applied per unit of the polyamide build material composition 12 in the portion 32 may depend upon whether it is desirable to impart solubility at the voxel surface and/or through the voxel volume, upon the desired conversion of the surface N—H groups to N-trifluoroacetylated products in the resulting portion(s) 36 of the 3D object layer 30, upon the volume of polyamide build material composition 12 in the layer 10, and the volume of the fusing agent 26, 26' that is applied.

The BMRFA 34 can provide a cooling effect, and thus the ratio of BMRFA 34 to fusing agent 26 or 26' is controlled in order to achieve both fusing and a desired level of N—H group conversion. In an example, a weight ratio of the trifluoroacetic anhydride in the selectively applied BMRFA 34 to an electromagnetic radiation absorber in the selectively applied fusing agent 26, 26' ranges from about 0.1 to about 5. In another example, the weight of the trifluoroacetic anhydride applied to the portion 32 ranges from about 1.5 times to about 2.25 times more than the weight of the electromagnetic radiation absorber applied to the portion 32.

In the example shown in FIG. 3, the detailing agent 38 is also selectively applied to the portion(s) 40 of the layer 10. The portion(s) 40 are not patterned with the fusing agent 26, 26' and thus are not to become part of the final 3D object layer 30. Thermal energy generated during radiation exposure may propagate into the surrounding portion(s) 40 that do not have the fusing agent 26, 26' applied thereto. The propagation of thermal energy may be inhibited, and thus the coalescence of the non-patterned build material portion(s) 40 may be prevented, when the detailing agent 38 is applied to these portion(s) 44.

After the agents 26 or 26', 34, and 38 are selectively applied in the specific portion(s) 28, 32, and 40 of the layer 10, the entire layer 10 of the polyamide build material composition 12 is exposed to electromagnetic radiation (shown as EMR in FIG. 3).

The electromagnetic radiation is emitted from the radiation source 24. The length of time the electromagnetic radiation is applied for, or energy exposure time, may be dependent, for example, on one or more of: characteristics of the radiation source 24; characteristics of the polyamide build material composition 12; and/or characteristics of the fusing agent 26, 26'.

It is to be understood that the electromagnetic radiation exposure may be accomplished in a single radiation event or in multiple radiation events. In an example, the exposing of the polyamide build material composition 12 is accomplished in multiple radiation events. In a specific example, the number of radiation events ranges from 3 to 8. In still another specific example, the exposure of the polyamide build material composition 12 to electromagnetic radiation may be accomplished in 3 radiation events. It may be desirable to expose the polyamide build material composition 12 to electromagnetic radiation in multiple radiation events to counteract a cooling effect that may be brought on by the amount of the agents 26 or 26', 34, 38 that is applied to the build material layer 10. Additionally, it may be desirable to expose the polyamide build material composition 12 to electromagnetic radiation in multiple radiation events to sufficiently elevate the temperature of the build material composition 12 in the portion(s) 28, 32, without over heating the build material composition 12 in the non-patterned portion(s) 40.

The fusing agent 26 or 26' enhances the absorption of the radiation, converts the absorbed radiation to thermal energy, and promotes the transfer of the thermal heat to the build material composition 12 in contact therewith. In an example, the fusing agent 26, 26' sufficiently elevates the temperature of the build material composition 12 in the portion 28 to a temperature above the melting point or within the melting range of the polymeric material, allowing coalescing/fusing (e.g., thermal merging, melting, binding, etc.) of the build material composition 12 to take place. The application of the electromagnetic radiation forms the 3D object layer 30, which, in some examples, includes a modified, trifluoroacetylated polyamide portion 36.

In some examples, the electromagnetic radiation has a wavelength ranging from 800 nm to 4000 nm, or from 800 nm to 1400 nm, or from 800 nm to 1200 nm. Radiation having wavelengths within the provided ranges may be absorbed (e.g., 80% or more of the applied radiation is absorbed) by the fusing agent 26, 26' and may heat the polyamide build material composition 12 in contact therewith, and may not be substantially absorbed (e.g., 25% or less of the applied radiation is absorbed) by the non-patterned build material composition 12 in portion(s) 40.

In the example shown in FIG. 3, the 3D object layer 30 includes the trifluoroacetylated polyamide portion 36, which expands the solubility of the portion 36 compared to non-modified polyamide. The trifluoroacetylated polyamide portion 36 corresponds with the portion 32 patterned with both the fusing agent 26, 26' and the BMRFA 34.

After the 3D object layer 30 is formed, additional layer(s) may be formed thereon to create an example of the 3D object. To form the next layer, additional polyamide build material composition 12 may be applied on the layer 30. The fusing agent 26 or 26' is then selectively applied on at least a portion of the additional build material composition 12, according to the 3D object model. The BMRFA 34 may also be applied, for example, if increased solubility is desired in the next layer. The detailing agent 38 may be applied in any area of the additional build material composition 12 where coalescence is not desirable. After the agent(s) 26 or 26', 34, 38 is/are applied, the entire layer of the additional build material composition 12 is exposed to electromagnetic radiation in the manner described herein. The application of additional polyamide build material composition 12, the selective application of the agent(s) 26 or 26', 34, 38, and the electromagnetic radiation exposure may be repeated a predetermined number of cycles to form the final 3D object 30 in accordance with the 3D object model. As mentioned, it is generally not desirable to apply the BMRFA 34 on the innermost layers during 3D printing, in order to maintain the strength of the 3D object.

Some examples of the method 100 include repeating the applying of the polyamide build material composition 12, the selectively applying of the fusing agent 26 or 26', the selectively applying of the BMRFA 34, and the exposing, to form a predetermined number of 3D object layers and a 3D printed object, wherein the more soluble trifluoroacetylated polyamide portion 36 extends around an exterior of the 3D printed object. In these examples, the BMRFA 34 may be applied on build material that is at or adjacent to object edges, according to the 3D object model.

In some examples of the method 100, it may be desirable to form a predetermined number of 3D object layers (e.g., adjacent to one another) that have respective trifluoroacetylated polyamide portions 36. In this example, the method 100 includes iteratively applying the polyamide build material composition 12 to form individual build material layers 10; selectively applying the fusing agent 26 or 26' on the individual build material layers 10 to form individual patterned portions 28; selectively applying the BMRFA 34 onto at least a portion 32 of the individual patterned portions 28; and exposing the individual build material layers 10 to energy.

While not shown in FIG. 3, the method 100 also includes exposing the 3D object (including the object layer 30 having the trifluoroacetylated polyamide portion 36) to a solvent to reduce a surface roughness of the trifluoroacetylated polyamide portion 36. The solubilization of the trifluoroacetylated polyamide portion 36 is described in further detail herein under the sub-heading "Solubilization of the Trifluoroacetylated Polyamide Portion."

Figure 4:
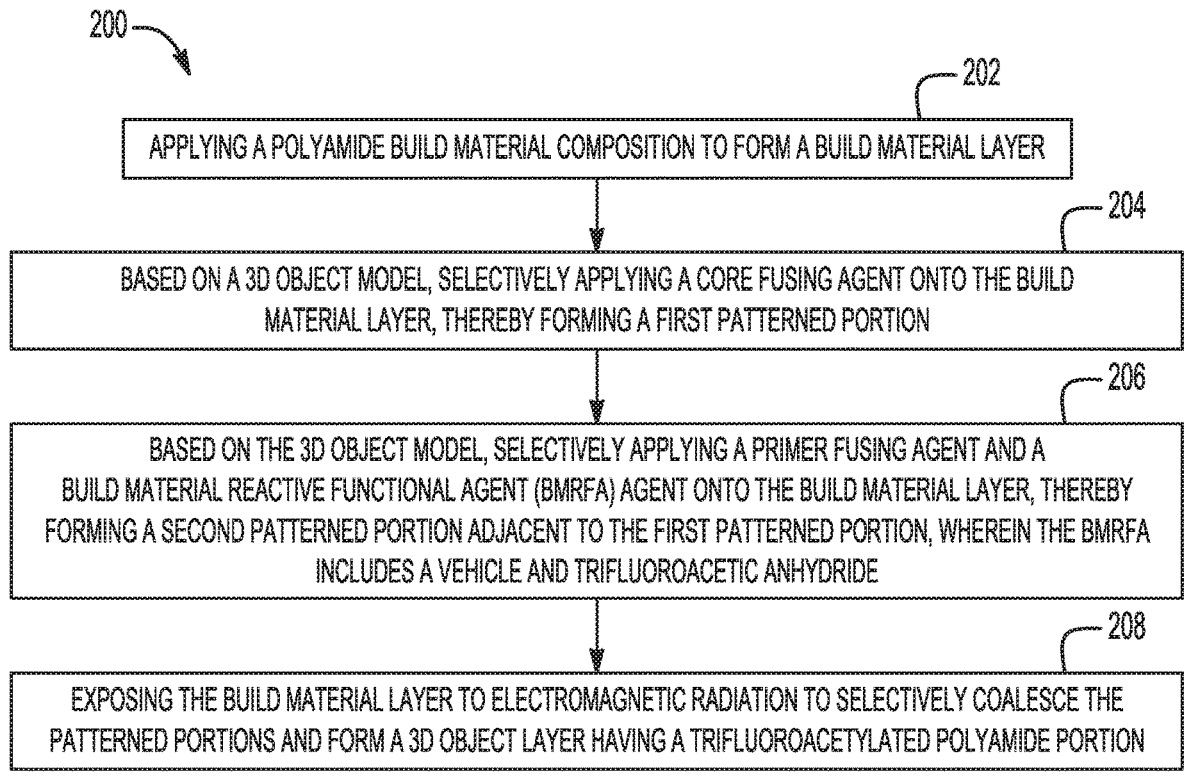
FIG. 4 is a flow diagram depicting another example of a 3D printing method.

Printing with the Build Material Reactive Functional Agent and Both Fusing Agents Referring now to FIG. 4, an example of the method 200 which utilizes the BMRFA 34 and both of the fusing agents 26 and 26' is depicted.

The method 200 shown in FIG. 4 includes applying a polyamide build material composition to form a build material layer (reference numeral 202); based on a 3D object model, selectively applying a core fusing agent onto the build material layer, thereby forming a first patterned portion (reference numeral 204); based on the 3D object model, selectively applying a primer fusing agent and a build material reactive functional agent (BMRFA) onto the build material layer, thereby forming a second patterned portion adjacent to the first patterned portion, wherein the BMRFA includes water and trifluoroacetic anhydride (reference numeral 206); and exposing the build material layer to electromagnetic radiation to selectively coalesce the patterned portions and form a 3D object layer having a trifluoroacetylated polyamide portion (reference numeral 208).

Figure 5:
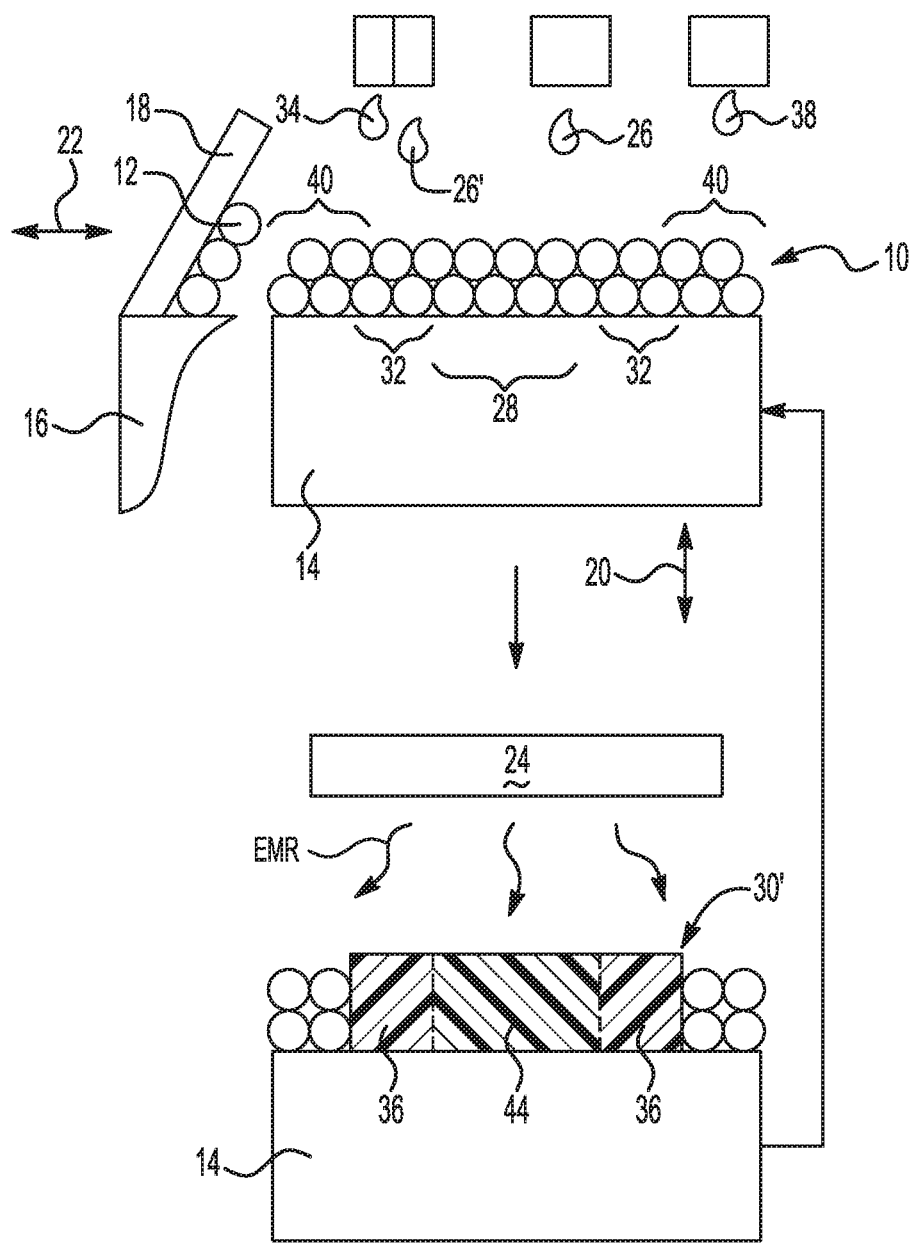
FIG. 5 is a schematic illustration of one example of the 3D printing method of FIG. 4.

The method 200 is shown schematically in FIG. 5. In FIG. 5, one layer 10 of the polyamide build material composition 12 is applied on the build area platform 14 as described in reference to FIG. 3. After the polyamide build material composition 12 has been applied, and prior to further processing, the build material layer 10 may be exposed to pre-heating as described in reference to FIG. 3.

In this example of the method 200, the core fusing agent(s) 26 is selectively applied on at least some of the polyamide build material composition 12 in the layer 10 to form a first patterned portion 28; and the primer fusing agent(s) 26' and the BMRFA 34 are selectively applied on at least some of the polyamide build material composition 12 in the layer 10 to form second patterned portion(s) 32 that are adjacent to the first patterned portion 28. The first patterned portion 28 is generally located at an interior portion of the build material layer 10 and the second patterned portion 32 is generally located at an exterior portion of the build material layer 10 where it is desirable to impart enhanced solubility at one or more surface(s) of the 3D printed object layer 30'.

The volume of the core fusing agent 26 that is applied per unit of the polyamide build material composition 12 in the first patterned portion 28 may be sufficient to absorb and convert enough electromagnetic radiation so that the build material composition 12 in the patterned portion 28 will coalesce/fuse.

The volume of the primer fusing agent 26' that is applied per unit of the polyamide build material composition 12 in the second patterned portion 32 may be sufficient to absorb and convert enough electromagnetic radiation so that the polyamide build material composition 12 in the second patterned portion 32 will coalesce/fuse.

The volume of the BMRFA 34 that is applied per unit of the polyamide build material composition 12 in the second patterned portion 32 may depend upon whether it is desirable to impart solubility at the voxel surface and/or through the voxel volume, upon the desired conversion of the surface N—H groups to N-trifluoroacetylated products in the resulting portion(s) 36 of the 3D object layer 30', upon the volume of polyamide build material composition 12 in the layer 10, and the volume of the fusing agent 26, 26' that is applied.

In the example shown in FIG. 5, the detailing agent 38 is also selectively applied to the portion(s) 40 of the layer 10. The portion(s) 40 are not patterned with the fusing agent 26, 26' and thus are not to become part of the final 3D object layer 30'.

After the agents 26, 26', 34, and 38 are selectively applied in the specific portion(s) 28, 32, and 40 of the layer 10, the entire layer 10 of the build material composition 12 is exposed to electromagnetic radiation (shown as EMR in FIG. 5). Radiation exposure may be accomplished as described in reference to FIG. 3.

In this example, the respective fusing agents 26 and 26' enhance the absorption of the radiation, convert the absorbed radiation to thermal energy, and promote the transfer of the thermal heat to the build material composition 12 in contact therewith. In an example, the fusing agents 26, 26' sufficiently elevate the temperature of the build material composition 12 in the respective portions 28, 32 to a temperature above the melting point or within the melting range of the polymeric material, allowing coalescing/fusing (e.g., thermal merging, melting, binding, etc.) of the polyamide build material composition 12 to take place. The application of the electromagnetic radiation forms the 3D object layer 30', which, in this example, includes a core portion 44 (without increased solubility) and trifluoroacetylated polyamide portions 36 (with increased solubility) at opposed ends of the core portion 44.

FIG. 5 illustrates one example of how the core fusing agent 26, the primer fusing agent 26' and the BMRFA agent 34 may be used together to pattern a single build material layer 10.

When both fusing agents 26 and 26' are used to build up a 3D object, it may be desirable to utilize the core fusing agent 26 to form the core (e.g., the center or inner-most portion) of the 3D object, and it may be desirable to utilize the primer fusing agent 26' to form the outermost layers of the 3D object. The core fusing agent 26 can impart strength to the core of the 3D object, while the primer fusing agent 26' enables white or a color to be exhibited at the exterior of the 3D object. It is to be understood that the BMRFA 34 may also be used to convert the polyamide to the trifluoroacetylated polyamide, and impart the desirable solubility to one or more surface portions 36 of the 3D object.

In some examples, it may be desirable to form a predetermined number of 3D object layers (e.g., adjacent to one another) that are trifluoroacetylated polyamide portions 36. In some of these examples, the 3D object layer(s) may be outer layer(s) of the 3D printed object, and the fusing agent used to pattern these outer layer(s) is the primer fusing agent 26'. In these examples, prior to forming the outer layer(s), the method may further include forming a core of the 3D printed object by iteratively applying the polyamide build material composition 12 to form respective build material layers 10; selectively applying a core fusing agent 26 on the respective build material layers 10 to form respective patterned portions 28; and exposing the respective build material layers to energy.

Figure 6:
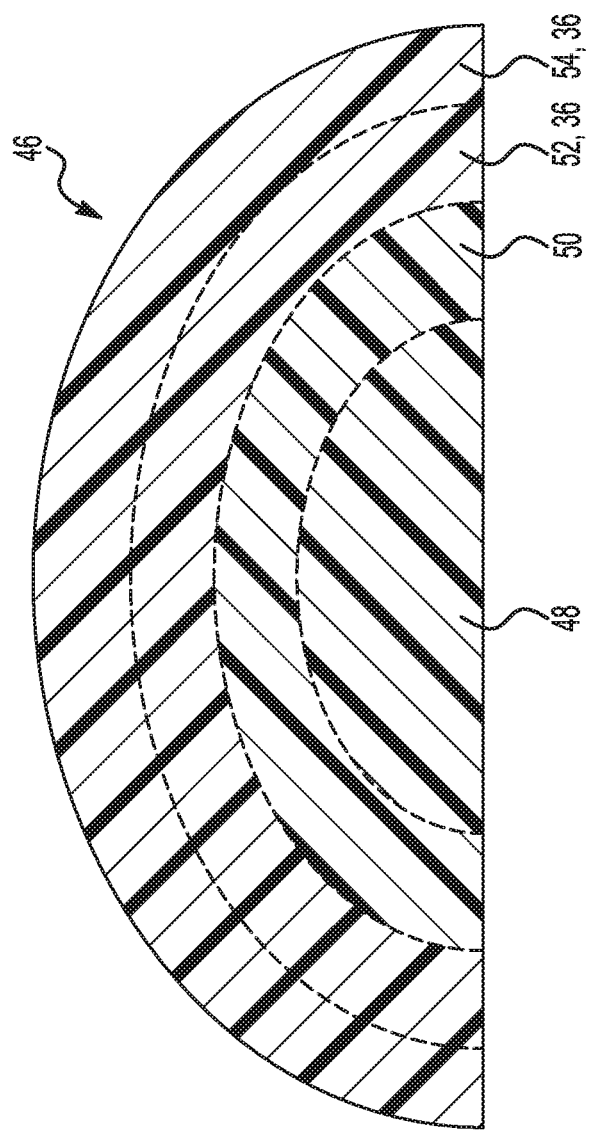
FIG. 6 is a cross-sectional view of an example 3D object.

An example of a 3D object 46 formed with the primer fusing agent 26' and the BMRFA 34 and the core fusing agent 26 is shown in FIG. 6. To form this example of the 3D object 46, the core fusing agent 26 would be applied on multiple layers of the polyamide build material composition 12 to pattern and ultimately form the inner portions 48 and 50 of the 3D printed object 46, and the primer fusing agent 26' and the BMRFA 34 would be applied on multiple layers of the polyamide build material composition 12 to pattern and ultimately form the outermost portions 52 and 54 of the 3D printed object 46. After each build material layer 10 is patterned with the agent(s) 26 and/or 26' and 34, electromagnetic radiation may be applied to solidify the respective patterned build material layers. In this example, the outermost portions 52 and 54 would include trifluoroacetylated polyamide. When exposed to solvent-based post-processing (described in more detail below), these outermost portions 52 and 54 dissolve, which can smooth the surface and eliminate o minimize defects.

Figure 7:
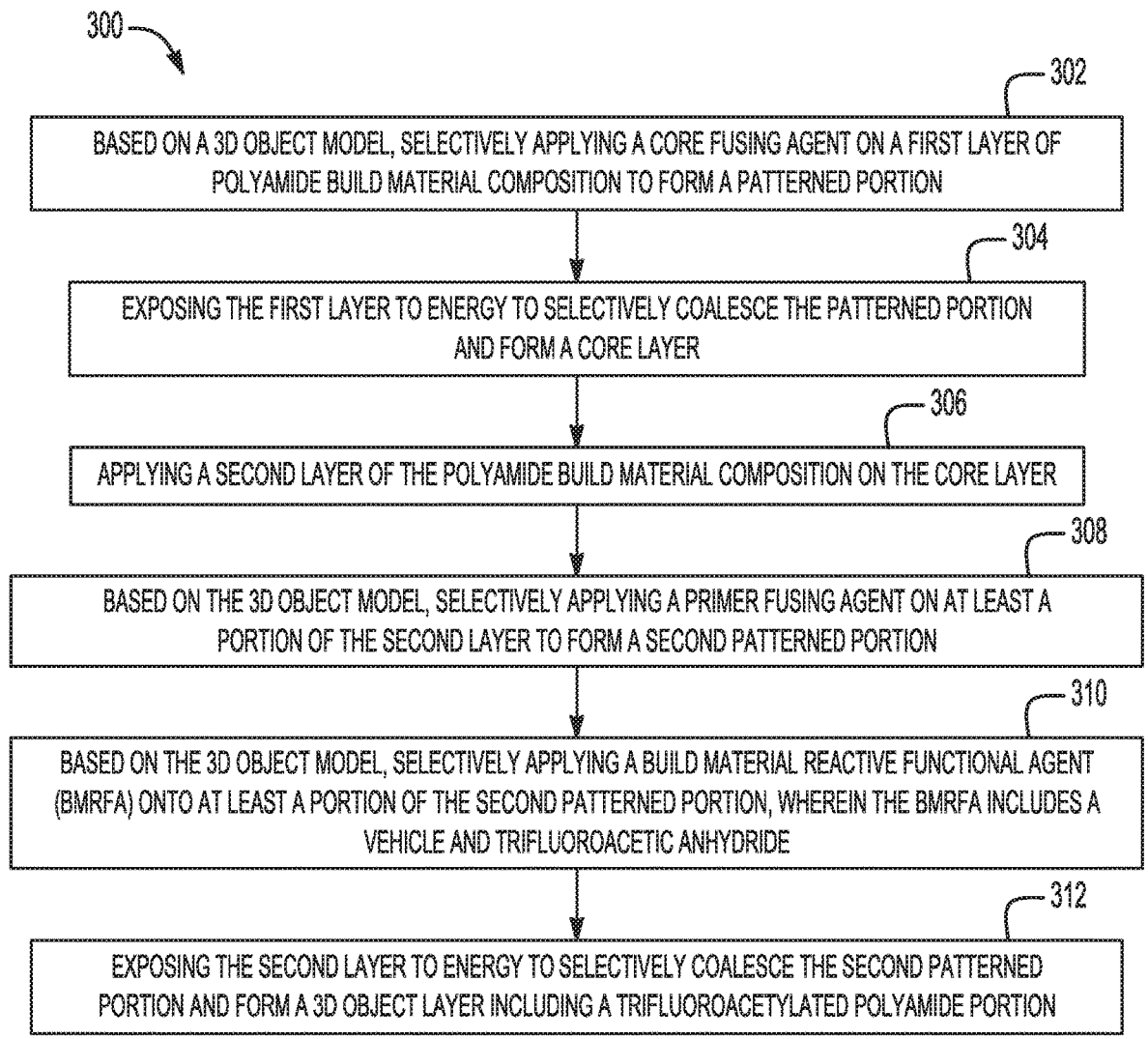
FIG. 7 is a flow diagram depicting another example of a 3D printing method.
Figure 8:
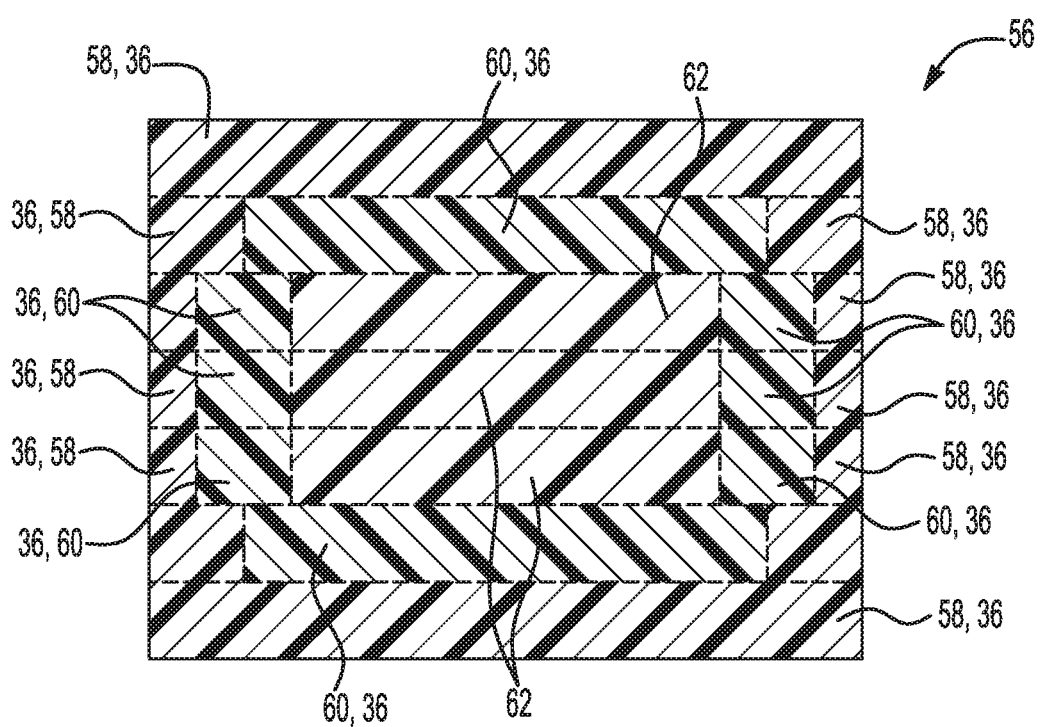
FIG. 8 is a cross-sectional view of another example 3D object.

Another example of the method 300 using each of these agents 26, 26', 34 is shown in FIG. 7, and an example of the resulting 3D object 56 is shown in FIG. 8.

The method 300 includes based on a 3D object model, selectively applying a core fusing agent on a first layer of polyamide build material composition to form a patterned portion 28 (reference numeral 302); exposing the first layer to energy to selectively coalesce the patterned portion and form a core layer (reference numeral 304); applying a second layer of the polyamide build material composition on the core layer (reference numeral 306); based on the 3D object model, selectively applying a primer fusing agent on at least a portion of the second layer to form a second patterned portion (reference numeral 308); based on the 3D object model, selectively applying a build material reactive functional agent (BMRFA) on at least a portion of the second patterned portion, wherein the BMRFA includes water and trifluoroacetic anhydride (reference numeral 310); and exposing the second layer to energy to selectively coalesce the second patterned portion and form a 3D object layer (in this example, a primer layer) including a trifluoroacetylated polyamide portion (reference numeral 312). Some examples of the method 300 further includes selectively applying the primer fusing agent 26' and the BMRFA 34 on the first layer at an area adjacent to the patterned portion, whereby the area coalesces to form a trifluoroacetylated polyamide edge portion adjacent to the core layer.

An example of the 3D object 56 formed using the method 300 is shown in FIG. 8. To form this example of the 3D object 56, the outermost build material layer(s) and the outermost edges of the middle build material layers would be patterned with the primer fusing agent 26' and the BMRFA 34 to form 3D object layers 58, 60, each of which has trifluoroacetylated polyamide portions 36. This example illustrates the trifluoroacetylated polyamide portions 36 at the entire exterior of the 3D object 56, but it is to be understood that the BMRFA 34 may be selectively applied so that portions of the exterior are converted to the trifluoroacetylated polyamide portions 36, while other portions of the exterior are not converted to the trifluoroacetylated polyamide portions 36. This may be desirable, for example, for an object that is to have some smooth area and some rough areas. In the example shown in FIG. 8, the innermost portions of the middle build material layers would be patterned with the core fusing agent 26 (and not with the BMRFA 34) to form the core portions 62 of the object 56.

In this example of the method 300, any number of core layers 62 (without trifluoroacetylated polyamide portions 36) may be formed, and any number of 3D object layers 58, 60 (with trifluoroacetylated polyamide portions 36) may be formed.

In one example of the method 300, a predetermined number of 3D object layers without trifluoroacetylated polyamide portions 36 (i.e., core layers 62) are formed by iteratively applying the polyamide build material composition 12 to form respective build material layers 10; selectively applying the core fusing agent 26 on the respective build material layers 10 to form respective patterned portions 28; and exposing the respective build material layers to energy. In some examples, the predetermined number of 3D object layers without trifluoroacetylated polyamide portions 36 (i.e., core layers 62) is formed on top of a predetermined number of 3D object layers 58, 60 having respective trifluoroacetylated polyamide portions 36. In these examples, the method 300 may also include forming a second predetermined number of 3D object layers 58, 60 having respective trifluoroacetylated polyamide portions 36 on the predetermined number of 3D object layers without trifluoroacetylated polyamide portions 36 (i.e., core layers 62) by iteratively applying the polyamide build material composition 12 to form additional individual build material layers 10; selectively applying the primer fusing agent 26' on the additional individual build material layers 10 to form additional individual patterned portions 32; selectively applying the BMRFA 34 onto at least a portion of the additional individual patterned portions 32; and exposing the additional individual build material layers to energy.

In the example shown in FIG. 8, the coloring agent may also be applied with the primer fusing agent 26' to generate color at the exterior surfaces of the object 56. For example, the coloring agent may be applied with the primer fusing agent 26' and the BMRFA 34 on the build material that forms the 3D object layers 58. Since the primer fusing agent 26' is clear or slightly tinted and the polyamide build material composition 12 is white or off-white, the color of the coloring agent will be the color of the resulting 3D object layers 58. The colorant of the coloring agent becomes embedded throughout the coalesced/fused build material composition of the 3D object layers 58. In this example, the 3D object layers 60 (which white or slightly tinted) may or may not have the coloring agent applied thereto. These intermediate layers 60 may help to form a mask over the black (or dark colored) core layers 62 because they optically isolate the core layers 62.

While several variations of the objects 46, 56 and the combinations of fusing agents 26, 26' have been described, it is to be understood that the fusing agents 26, 26' may be used to form any desirable 3D object.

Solubilization of the Trifluoroacetylated Polyamide Portion

Referring back to FIG. 2, the example method 100 includes exposing the 3D object layer to a solvent to reduce surface roughness of the trifluoroacetylated polyamide portions 36 (shown at reference numeral 110). While not shown in FIGS. 5 and 7, it is to be understood that each of the example methods 200, 300 disclosed herein also includes this solvent-based post-printing process.

Prior to the solvent-based post-printing process, the 3D printed object may be removed from the build area platform 14 and excess (non-coalesced) polyamide build material composition 12 may be removed from the 3D object.

The 3D object may then be dipped into a solution of a solvent.

During the printing process, the BMRFA 34 changes the chemical structure of the polyamide build material 12 by introducing polarity to the polymer backbone and thereby increasing its solubility in a wider range of solvents. As such, the solvent selected will depend upon the polyamide build material used, and in particular on the carbon chain length of the polyamide repeat units. The solvents may be more gentle (e.g., than harsh solvents) and involve benign conditions (e.g., room temperature, ease of handling, etc.). While the solvent used may depend upon the polyamide, example solvents include tetrahydrofuran (THF), dioxane, chlorinated hydrocarbons, acetone, acetonitrile, dimethylformamide (DMF), and combinations thereof.

The entire 3D object can be immersed in the solvent, as the trifluoroacetylated polyamide portion(s) 36 alone will be affected. This process exposes the 3D printed object to a relatively gentle solvent to solubilize the trifluoroacetylated polyamide portions 36. The solvent immersion should be adequate to remove the more soluble trifluoroacetylated polyamide portion(s) 36 and should also be self-limiting. As described herein, the trifluoroacetylated polyamide portion(s) 36 is/are formed in the outermost layer(s) and/or at the edge(s), and thus is/are located at the exterior of the 3D printed object. The innermost layer(s), which are not formed with the BMRFA 34 and thus include non-modified polyamide, are impervious to the solvent. This prevents (or at least minimizes) any alteration of the internal structure, thus ensuring maintenance of mechanical properties. This also makes solvent removal after post-print processing less cumbersome.

In the examples disclosed herein, it is to be understood that full conversion of the surface N—H groups to N-trifluoroacetylated products may not be achieved. Partial conversion will enhance the solubility of the portion(s) 36, which enables surface roughness and/or defects to be minimized with any of the gentler solvents disclosed herein.

The solvent volume, immersion time, and immersion temperature may vary depending upon chemistry of the polyamide and the trifluoroacetylated polyamide portion(s) 36, the thickness of the trifluoroacetylated polyamide portion(s) 36, the size of the 3D object, etc.

In examples where color is incorporated at the surface of the 3D object, the solvent post-print processing may remove some of the color. In these instances, it may be desirable to use the primer fusing agent 26' and the coloring agent (without the BMRFS 34) to form multiple layers between the trifluoroacetylated polyamide portions 36 (to be removed) and the core of the 3D object (formed with the core fusing agent 26).

Any of the example methods 100, 200, 300 disclosed herein may also include exposing the 3D printed object to water to convert any remaining (undissolved) trifluoroacetylated polyamide portions 36 back to chemically inert polyamide. Hydrolysis of the trifluoroacetylated polyamide is shown in the left reaction in FIG. 1. This conversion will impart strength back into the, now smoother, surfaces of the 3D object.

In any of the examples of the method 100, 200, 300 disclosed herein, any of the agents (fusing agent 26, 26', BMRFA 34, detailing agent 38 and/or coloring agent) may be dispensed from an applicator 42, 42', 42" (shown in FIG. 3 and FIG. 5). The applicator(s) 42, 42', 42" may each be a thermal inkjet printhead, a piezoelectric printhead, a continuous inkjet printhead, etc., and the selective application of the fusing agent 26, 26', BMRFA 34, detailing agent 38 and/or coloring agent may be accomplished by thermal inkjet printing, piezo electric inkjet printing, continuous inkjet printing, etc. The controller may process data, and in response, control the applicator(s) 42, 42', 42" to deposit the fusing agent 26, 26', BMRFA 34, detailing agent 38 and/or coloring agent onto predetermined portion(s) of the build material composition 12. It is to be understood that the applicators 42, 42', 42" may be separate applicators or a single applicator with several individual cartridges for dispensing the respective agents.

It is to be understood that the selective application of any of the fusing agent 26, 26', BMRFA 34, detailing agent 38 and/or coloring agent may be accomplished in a single printing pass or in multiple printing passes. In some examples, the agent(s) is/are selectively applied in a single printing pass. In some other examples, the agent(s) is/are selectively applied in multiple printing passes. In one of these examples, the number of printing passes ranging from 2 to 4. In still other examples, 2 or 4 printing passes are used. It may be desirable to apply the fusing agent 26, 26', BMRFA 34, detailing agent 38 and/or coloring agent in multiple printing passes to increase the amount, e.g., of the energy absorber, hydrophilic polymer, colorant, etc. that is applied to the build material composition 12, to avoid liquid splashing, to avoid displacement of the build material composition 12, etc.

To further illustrate the present disclosure, a prophetic example is given herein. It is to be understood that this example is provided for illustrative purposes and is not to be construed as limiting the scope of the present disclosure.

Pophetic Example

Two example formulations of the build material reactive functional agent (BMRFA1 and BMRFA 2) are shown in Table 1. The weight percentages in Table 1 represent the active amount.

TABLE 1

| Category | Ingredient | BMRFA 1 (wt %) | BMRFA 2 (wt %) |
|---|---|---|---|
| Co-Solvent | Acetonitrile | 40 | 40 |
| Reactive Additive | Trifluoroacetic anhydride | 10 | 10 |
| Surfactant | TERGITOL ® 15-S-9 | 1 | 1 |
| Catalyst | 4-Dimethylaminopyridine | None | 0.1 |
| Buffer | TRIS ® | None | 0.5 |
| Solvent | Water | Balance | Balance |

BMRFA 1 and BMFRA 2 are used in a 3D printing process. The build material is polyamide-12 and the fusing agent formulation is shown in Table 2. The weight percentages in Table 2 represent the active amount unless noted otherwise with the phrase "as is".

TABLE 2

| Category | Ingredient | FA (wt %) |
|---|---|---|
| Energy Absorber | cesium tungsten oxide | 9 |
| Organic Co-Solvent | 1-methyl-2-pyrrolidone | 20 |
| Surfactant | Tergitol ® 15-S-7 | 0.75 |
| Anti-kogation Agent | Crodafos ® O3A | 0.5 |
| Stabilizers | Betaine | 5 |
|  | Beta-alanine | 5 |
| Solvent | Water | Balance |

A layer of the polyamide-12 build material is spread on a build area platform and is patterned with the fusing agent and exposed to electromagnetic radiation. Additional layers are printed in a similar manner to form cubes. A control cube is printed with the fusing agent alone (neither BMRFA 1 nor BMRFA 2 is used). A first example cube (example cube 1) is printed with the fusing agent and BMRFA 1 in the outermost layers (3-5 layers) on each side of the cube. Another example cube (example cube 2) is printed with the fusing agent and BMRFA 2 in the outermost layers (3-5 layers) on each side of the cube.

After printing, the control cube, example cube 1, and example cube 2 are submerged in acetone. The control cube is impervious to the acetone. The outermost layers of example cube 1 and example cube 2 are removed by the acetone. Examples cubes 1 and 2 have a smoother surface than the control cube.

It is to be understood that the ranges provided herein include the stated range and any value or sub-range within the stated range. For example, from about 0.01 wt % to about 3 wt % should be interpreted to include not only the explicitly recited limits of from about 0.01 wt % to about 3 wt %, but also to include individual values, such as about 0.25 wt %, about 0.55 wt %, about 1.74 wt %, about 2.03 wt %, about 2.2 wt %, about 2.5 wt %, etc., and sub-ranges, such as from about 0.2 wt % to about 2.8 wt %, from about 1 wt % to about 2 wt %, from about 0.05 wt % to about 2.75 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:
1. A multi-fluid kit for three-dimensional (3D) printing, comprising:
a fusing agent including water and an electromagnetic radiation absorber; and
a build material reactive functional agent including a vehicle and trifluoroacetic anhydride.

2. The multi-fluid kit as defined in claim 1 wherein the vehicle includes water, a water miscible organic solvent that is inert to the trifluoroacetic anhydride, or a combination of water and the water miscible organic solvent.

3. The multi-fluid kit as defined in claim 2 wherein:
the vehicle includes the water miscible organic solvent or the combination; and
the organic solvent is selected from the group consisting of acetonitrile, tetrahydrofuran, 1,4-dioxane, acetone, dimethylformamide, ethyl acetate, chlorinated hydrocarbons, and combinations thereof.

4. The multi-fluid kit as defined in claim 1 wherein the build material reactive functional agent further comprises a surfactant.

5. The multi-fluid kit as defined in claim 1 wherein the trifluoroacetic anhydride is present in an amount ranging from about 1 wt % active to about 20 wt % active of a total weight of the build material reactive functional agent.

6. The multi-fluid kit as defined in claim 1, further comprising:
a coloring agent selected from the group consisting of a black ink, a cyan ink, a magenta ink, or a yellow ink; or
a detailing agent including a surfactant, a co-solvent, and water; or
both the coloring agent and the detailing agent.

7. The multi-fluid kit as defined in claim 1 wherein the fusing agent is a primer fusing agent and the electromagnetic radiation absorber is a plasmonic resonance absorber having absorption at wavelengths ranging from 800 nm to 4000 nm and having transparency at wavelengths ranging from 400 nm to 780 nm.

8. The multi-fluid kit as defined in claim 1 wherein the fusing agent is a core fusing agent and the electromagnetic radiation absorber has absorption at least at wavelengths ranging from 400 nm to 780 nm.

9. A three-dimensional (3D) printing kit, comprising:
a powder polyamide build material;
a fusing agent including water and an electromagnetic radiation absorber; and
a build material reactive functional agent including a vehicle and trifluoroacetic anhydride.

10. The 3D printing kit as defined in claim 9 wherein the vehicle includes:
water, a water miscible organic solvent that is inert to the trifluoroacetic anhydride; or a combination of water and the water miscible organic solvent; and
a surfactant.

11. The 3D printing kit as defined in claim 9 wherein the fusing agent is:
a core fusing agent and the electromagnetic radiation absorber has absorption at least at wavelengths ranging from 400 nm to 780 nm; or
a primer fusing agent and the electromagnetic radiation absorber is a plasmonic resonance absorber having absorption at wavelengths ranging from 800 nm to 4000 nm and having transparency at wavelengths ranging from 400 nm to 780 nm.

12. A method for three-dimensional (3D) printing, comprising:
applying a polyamide build material composition to form a build material layer;
based on a 3D object model, selectively applying a fusing agent on at least a portion of the build material layer, thereby forming a patterned portion;
based on the 3D object model, selectively applying a build material reactive functional agent onto at least a portion of the patterned portion, the build material reactive functional agent including a vehicle and trifluoroacetic anhydride;
exposing the build material layer to electromagnetic radiation to selectively coalesce the patterned portion and form a 3D object layer having a trifluoroacetylated polyamide portion; and
exposing the 3D object layer to a solvent to reduce a surface roughness of the trifluoroacetylated polyamide portion.

13. The method as defined in claim 12, wherein:
the 3D object layer is an outer layer of a 3D printed object;
the fusing agent is a primer fusing agent; and
prior to forming the outer layer, the method further comprises forming a core of the 3D printed object by:
iteratively applying the polymeric build material to form respective build material layers;
selectively applying a core fusing agent on the respective build material layers to form respective patterned portions; and
exposing the respective build material layers to energy.

14. The method as defined in claim 13, further comprising forming a predetermined number of outer layers having respective trifluoroacetylated polyamide portions by:
iteratively applying the polymeric build material to form individual build material layers;
selectively applying the primer fusing agent on the individual build material layers to form individual patterned portions;
selectively applying the build material reactive functional agent onto at least a portion of the individual patterned portions; and
exposing the individual build material layers to energy.

15. The method as defined in claim 14, further comprising exposing the 3D printed object to water to convert the respective trifluoroacetylated polyamide portions to chemically inert polyamide.

* * * * *